US008113670B2

(12) United States Patent
Muraki et al.

(10) Patent No.: US 8,113,670 B2
(45) **Date of Patent: *Feb. 14, 2012**

(54) IMAGE RECORDING APPARATUS WITH PIVOTABLE DISPLAY

(75) Inventors: Motohito Muraki, Nagoya (JP); Takamitsu Kawai, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/019,179

(22) Filed: Feb. 1, 2011

(65) Prior Publication Data

US 2011/0123218 A1 May 26, 2011

Related U.S. Application Data

(63) Continuation of application No. 11/478,432, filed on Jun. 30, 2006, now Pat. No. 7,878,666.

(30) Foreign Application Priority Data

Jun. 30, 2005 (JP) ................................. 2005-192144

(51) Int. Cl.
*G03B 21/00* (2006.01)

(52) U.S. Cl. ......................... 353/122; 248/919; 248/923

(58) Field of Classification Search .................. 353/119, 353/122; 355/21; 248/917–923; 349/11; 361/679.21, 679.26–679.3

See application file for complete search history.

(56) References Cited

U.S. PATENT DOCUMENTS

| | | | | |
|---|---|---|---|---|
| 4,720,781 | A | 1/1988 | Crossland et al. | |
| 5,560,719 | A | 10/1996 | Ballard et al. | |
| 5,589,849 | A | 12/1996 | Ditzik | |
| 6,094,341 | A * | 7/2000 | Lin | 361/679.04 |
| 6,487,068 | B1 * | 11/2002 | Rahemtulla | 361/679.04 |
| 6,570,627 | B1 * | 5/2003 | Chang | 348/794 |
| 6,654,234 | B2 | 11/2003 | Landry et al. | |
| 6,754,070 | B2 * | 6/2004 | Chen | 361/679.26 |

(Continued)

FOREIGN PATENT DOCUMENTS

JP H07-008879 U 2/1995

(Continued)

OTHER PUBLICATIONS

HP Photosmart 385 Compact Photo Printer; Amazon.com; First Published Jun. 29, 2005 (by Amazon.com); http/www.amazon.co.uk/Photosmart-385-Compact-Photo-Printer/dp/B000A3P3VS; pp. 1-4. (submitted with Parent).

(Continued)

*Primary Examiner* — Tony Ko
*Assistant Examiner* — Jori S Reilly-Diakun
(74) *Attorney, Agent, or Firm* — Baker Botts L.L.P.

(57) ABSTRACT

An image recording apparatus includes an apparatus body, a recording section for forming an image, a display panel assuming upright and laying posture with respect to the apparatus body by pivoting on a predetermined axis, and a covering member having a first end and a second end. The first end is mounted pivotably on one of the apparatus body and the back surface of the display panel. The second end engages slidably with the other of the apparatus body and the back surface of the display panel. Accordingly, the covering member can be accommodated substantially in parallel with the back surface of the display panel. As a result, when the display panel is laid down, it is low in height, thereby making the image recording apparatus to be compact.

9 Claims, 26 Drawing Sheets

U.S. PATENT DOCUMENTS

| | | | |
|---|---|---|---|
| 6,850,226 B2 | 2/2005 | Finke-Anlauff | |
| 6,976,519 B2 | 12/2005 | Bivens | |
| 6,992,882 B2 * | 1/2006 | Wang | 361/679.57 |
| 7,062,197 B2 | 6/2006 | Kunugi | |
| 7,068,496 B2 * | 6/2006 | Wong et al. | 361/679.28 |
| 7,167,358 B2 * | 1/2007 | Iwasaki et al. | 361/679.21 |
| 7,301,759 B2 * | 11/2007 | Hsiung | 361/679.27 |
| 7,366,436 B2 | 4/2008 | Akiyama et al. | |
| 7,466,820 B2 * | 12/2008 | Lee | 379/428.03 |
| 7,566,006 B2 | 7/2009 | Cummings | |
| 7,636,133 B1 * | 12/2009 | Hsu | 348/794 |
| 7,764,490 B2 * | 7/2010 | Muraki | 361/679.21 |
| 7,878,666 B2 * | 2/2011 | Muraki et al. | 353/122 |
| 2001/0055196 A1 * | 12/2001 | Anzai et al. | 361/681 |
| 2002/0145847 A1 | 10/2002 | Crosby | |
| 2003/0121124 A1 * | 7/2003 | Chen | 16/339 |
| 2004/0239633 A1 | 12/2004 | Kogoh et al. | |
| 2005/0139740 A1 * | 6/2005 | Chen et al. | 248/286.1 |
| 2005/0205735 A1 * | 9/2005 | Ichikawa et al. | 248/292.12 |
| 2006/0082958 A1 | 4/2006 | Fujiwara | |
| 2006/0291152 A1 * | 12/2006 | Bremmon | 361/681 |
| 2009/0033951 A1 | 2/2009 | Sugahara | |

FOREIGN PATENT DOCUMENTS

| | | | |
|---|---|---|---|
| JP | H08-152936 A | | 6/1996 |
| JP | 2001-277654 A | | 10/2001 |
| JP | 2003-269440 A | | 9/2003 |
| JP | 2003269440 A | * | 9/2003 |

OTHER PUBLICATIONS

HP Photosmart 385: User Guide; Hewlett Packard; Copyrighted and Published: 2005 (by Hewlett Packard); pp. 1-68. (submitted with Parent).

HP Photosmart 380: User's Guide; Hewlett Packard; Copyrighted 2005 (by Hewlett-Packard); pp. 1-69. (submitted with Parent).

Japan Patent Office, Notice of Reasons for Rejection for Japanese Patent Application No. 2006-182024 (counterpart to above-captioned patent application), mailed Feb. 16, 2011.

* cited by examiner 49
49a
49b
49c
49d
51
51a
51b
52
52a
53a
53b
53c
54
54a
L1
L2
XIIC
XIID

IMAGE RECORDING APPARATUS WITH PIVOTABLE DISPLAY

CROSS REFERENCE TO RELATED APPLICATION

The present application is a continuation application of U.S. patent application Ser. No. 11/478,432, filed Jun. 30, 2006, which claims priority from Japanese Patent Application No. 2005-192144, filed on Jun. 30, 2005, the disclosure of which are incorporated herein by reference in their entirety.

BACKGROUND OF THE INVENTION

1. Field of the Invention

The present invention relates to a structure of an image recording apparatus provided with a panel display device such as a liquid crystal panel unit which can display data such as an image and/or a letter.

2. Description of Related Art

Conventional uni-function devices such as inkjet printers, copying machines, and fax machines, conventional multi-function and uni-function image recording apparatuses having a printing function, a copying function, a scanning function, and/or a facsimile function, and conventional electronic terminal devices are each provided with a display panel unit which informs an user of the instructions for achieving the functions of the associated device or recording apparatus, the present status of the device or recording apparatus, the procedure for operating the device or recording apparatus, and/or the like.

Japanese Utility Model Laid-open Publication No. 07-8879 describes an electronic terminal device having a main case and a display housing, which houses a flat and thin display element such as an LCD (liquid crystal display) element. The base end (lower end) of the display housing is connected to a surface (upper surface) of the main case such that the display housing can pivot up and down and be held at a suitable angle of inclination so that the information displayed on the screen on the display housing can be seen easily while the terminal device is used.

The lower end in the bask surface side of the display housing has a lead guide which is integrally formed on the lower end, and through which a filmy lead (a flexible flat cable) is extended (introduced) to the LCD element. The main case has an opening formed therein, and the lead guide can move into and out of the opening when the display housing pivots.

Japanese Patent Application Laid-open No. 2003-269440 discloses an electronic device having a casing and a movable body which is provided with a liquid crystal panel. The movable body is arranged pivotably on the upper case of the casing. An arbitrary angle holding mechanism has a link member and a locking mechanism block, one of which is connected to the movable body, and the other of which is connected to the casing. One end of the link member is in movable engagement with the locking mechanism block and can be locked at a predetermined position by the locking mechanism block. The movable body has a cover formed integrally on its back surface. The cover takes the form of a substantially quarter circle in a side view and opens downwardly. The upper case has an opening formed therethrough, and the cover is accommodated in the opening or is exposed out of the opening when the movable body pivots. A flexible flat cable extends from the inside of the cover through an opening to the inside of the upper case and is connected to the printed board in this case.

In each of Japanese Utility Model Laid-open Publication No. 07-8879 and Patent Application Laid-open No. 2003-269440, however, the cover or the lead guide for protecting the flexible flat cable is formed integrally with the case of the display housing. When the case (movable body) of the display housing pivots to a position or takes a posture substantially in parallel with the upper surface of the main case, the cover and the lead guide move through the opening of the main case deep into this case. This makes it necessary to form a space for the cover and the lead guide in advance in the main case. Accordingly, there is a problem that this main case becomes bulky. Further, for the cover and the lead guide formed integrally with the case (movable body) of the display housing, extra work is necessary for positioning the flexible flat cable through the cover and the lead guide.

SUMMARY OF THE INVENTION

The object of the present invention is to provide a compact image recording apparatus having a simple structure for protecting its flexible flat cable.

According to a first aspect of the present invention, there is provided an image recording apparatus including: an apparatus body; a recording section which forms an image; a display panel which pivots up and down on a predetermined axis with respect to the apparatus body; and a covering member having a first end mounted pivotably on one of the apparatus body and the display panel and a second end engaged slidably with the other of the apparatus body and the display panel.

The covering member can be accommodated or stored substantially in parallel with the back surface of the display panel. As a result, a height in a state when the display panel is laid down is low so that the image recording apparatus can be compact.

Further, the display panel can be erected at an arbitrary angle on the front side or the like of the image recording apparatus. This enables a user to adjust the angular position of the screen of the display panel so as to sharpen the contrast of the image on the screen, thereby making the displayed image data and messages easily visible.

Furthermore, since the first end of the covering member is mounted pivotably on one of the apparatus body and the display panel, and the second end of this member engages slidably with the other of the apparatus body and the display panel. As a result, the covering member can reinforce the display panel so as to keep the panel engaging with the apparatus body (so as to prevent the display panel disengaging from the apparatus body) even if a user lifts the panel inadvertently.

The image recording apparatus of the present invention may further include: a flexible flat cable extending from a back surface of the display panel; and a guide opening formed in the apparatus body; wherein the flexible flat cable may be connected to an electrical component through the guide opening.

In the present invention, when the display panel is in a posture at which the display panel is erected substantially upright, the covering member is inclined downward toward the rear of the image recording apparatus, so that the flexible flat cable and the guide opening are positioned between and covered with the back surface of the display panel and the inclined covering member. Even when the display panel is laid down with its screen substantially facing upward (in parallel with the upper surface of the apparatus body), the back surface of the display panel covers and protects the flexible flat cable and the guide opening. This prevents a user from touching the flexible flat cable carelessly and keeps trash, dust and other foreign bodies from entering the image recording apparatus through the guide opening. In addition, it is simple to put or arrange the flexible flat cable through the guide opening.

In the image recording apparatus of the present invention, the apparatus body may have an accommodation recess which is formed on an upper surface of the apparatus body, which is open upwardly, and in which the display panel is accommodable with the display panel assuming a posture in which a display screen of the display panel faces upwardly; wherein a pair of hinges may be provided at a bottom portion of the accommodation recess, the pair of hinges pivotably supporting a base portion of the display panel.

Accordingly, the display panel can be laid down in the accommodation recess. As a result, a height when the display panel is laid down is low so that the image recording apparatus can be compact.

In the image recording apparatus of the present invention, one of the display panel and the apparatus body may be provided with a guide groove with which the second end of the covering member engages slidably.

Accordingly, regardless of the angular position of the display panel, the second end of the covering member engages with the guide groove and can slide along it. This keeps the covering member engaging with the apparatus body and prevents trash and other foreign bodies from inadvertently entering in the back surface side of the display panel.

The image recording apparatus of the present invention may further include an anti-disengagement mechanism provided in the vicinity of the base portion of the display panel and the pair of hinges, the anti-disengagement mechanism including a contact part and an engagement part which engages with the contact part when the display panel is erected.

The anti-disengagement mechanism keeps the display panel from disengaging accidentally from the apparatus body even if a user lifts the panel. Further, the anti-disengagement mechanism regulates the forward pivoting movement of the display panel.

In the image recording apparatus of the present invention, the covering member may be formed to have a shape of flat plate and may be flexible.

Accordingly, while the flat portion of the flexible covering member is curved or warped, the first and second ends of the covering member can be easily attached to the display panel or the apparatus body. In this case, the attached covering member is kept from disengaging accidentally from the display panel or the apparatus body.

In the image recording apparatus of the present invention, at least one hinge of the pair of hinges is provided with a latch mechanism which holds the display panel at different angles around the axis.

With this construction, the latch mechanism makes it very simple to hold the display panel at a posture having an angular position at which the screen is easily visible for the user. The latch mechanism also makes it very simple to adjust the angular position of the display panel.

In this case, the covering member is attached in a state that the covering member supports the display panel from the back surface thereof. This increases the strength with which the display panel is held at an angle at which the screen is easily visible.

In the image recording apparatus of the present invention, a guide opening, through which the flexible flat cable extends, may be formed in a bottom portion of the accommodation recess; and a guide may be provided at the bottom portion of the accommodation recess around the guide opening, the guide preventing liquid from flowing downward into the guide opening.

In this case, even if liquid such as water is spilled accidentally on the bottom portion of the accommodation recess, the guide prevents the spilled liquid from flowing into the guide opening. This prevents the electrical components in the apparatus body from failing accidentally.

In the image recording apparatus of the present invention, a display cover may be attached removably to the upper surface of the apparatus body; and the accommodation recess in which the display panel is accommodated, and entry keys for instructing a plurality of functions of the image recording apparatus may be arranged in the display cover, the entry keys being arranged at the display cover on right and left sides respectively to intervene the accommodation recess therebetween.

In this case, it is simple to arrange the accommodation recess by attaching the display panel, which can pivot up and down, to the apparatus body and then mounting the display cover on the apparatus body in a state that the panel is erected. Since the entry keys are arranged in the display cover on the right and left sides of the display cover, it is easy to enter operating instruction messages etc. on the erected display panel during maintenance, replacement of parts or components, or the like.

In the image recording apparatus of the present invention, the first end of the covering member may be pivotably mounted on the display panel; and the second end of the covering member may be slidably engaged with the apparatus body.

Alternatively, in the image recording apparatus of the present invention, the first end of the covering member may be pivotably mounted on the apparatus body; and the second end of the covering member may be slidably engaged with the display cover.

In the image recording apparatus of the present invention, the back surface of the display panel may be flat.

In this case, a cover for protecting the flexible flat cable and/or a lead guide are not formed on the back surface of the display panel. Accordingly, when the display panel is accommodated in the accommodation recess while the display panel takes a posture such that its display screen faces upwardly (the display screen is substantially in parallel with the upper surface of the apparatus body), there is no need to form in the apparatus body in advance a space for accommodating the cover and/or the lead guide. This enables the apparatus body to be low in size.

In the image recording apparatus of the present invention, when the display panel is accommodated in the accommodation recess, the covering member may be accommodated in the accommodation recess to be in parallel with a back surface of the panel.

This makes it possible to accommodate the display panel and the covering member compactly in the accommodation recess.

PREFERRED EMBODIMENTS OF THE INVENTION

Embodiments of the present invention will be described below in detail with reference to the drawings.

First Embodiment

A first embodiment of the present invention will be described below. An image recording apparatus 1 according to the first embodiment is a multi-function device (MFD) having printing, copying, scanning and faxing functions. In the embodiment shown in FIGS. 1 and 2, the image recording apparatus 1 has a lower body 2 as a housing (apparatus body), which is an injection molding of synthetic resin.

Figure 1:
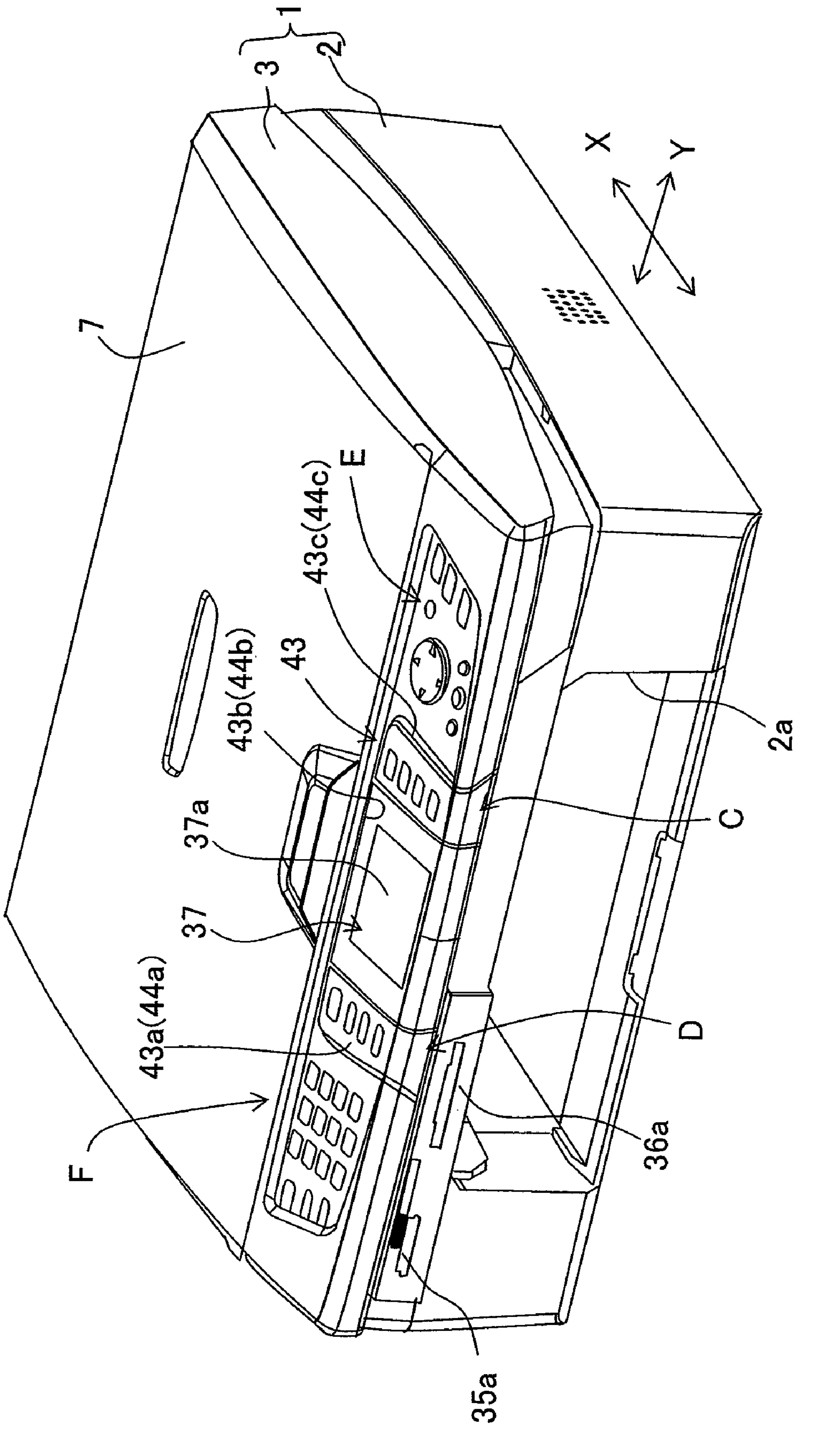
FIG. 1 is a perspective view of an image recording apparatus of an embodiment to which the present invention is applied.
Figure 2:
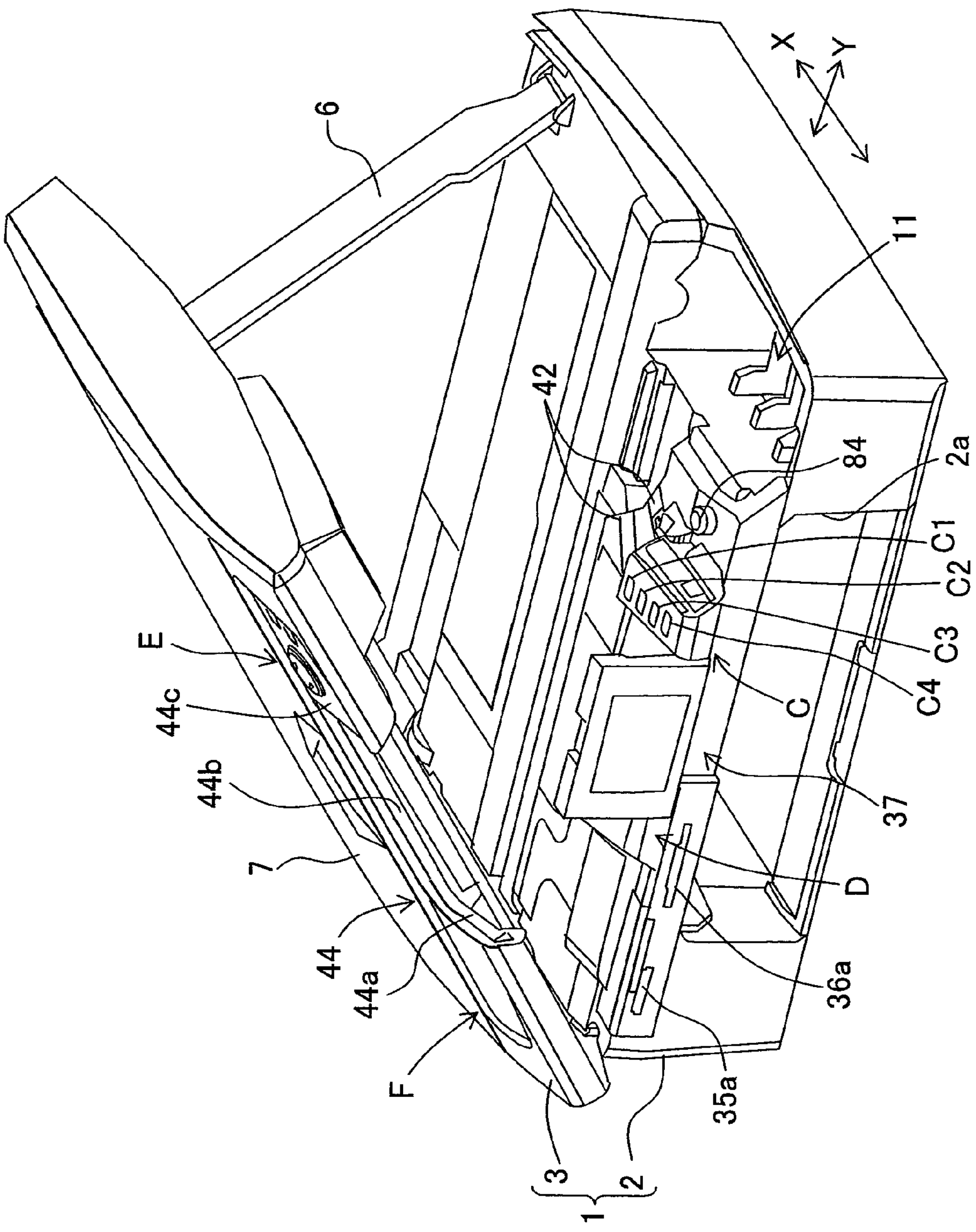
FIG. 2 is a perspective view of the image recording apparatus, showing its upper body opened widely upward from its lower body.

The image recording apparatus 1 also has an upper body 3, which is another injection molding of synthetic resin. The upper body 3 is attached to the upper surface of the lower body 2 and can pivot up and down on a pivot axis 4 on one of the right and left sides of the lower body 2. Specifically, when an opening 2*a* is formed on the front surface (FIG. 1) of the lower body 2, the pivot axis 4, on which the upper body 3 pivots relative to the lower body 2, is positioned on the left side of the lower body 2. As shown in FIG. 2, the upper body 3 can be held in an open position by a stay or strut 6, one end of which is attached pivotably on the upper surface of the lower body 2.

Figure 5:
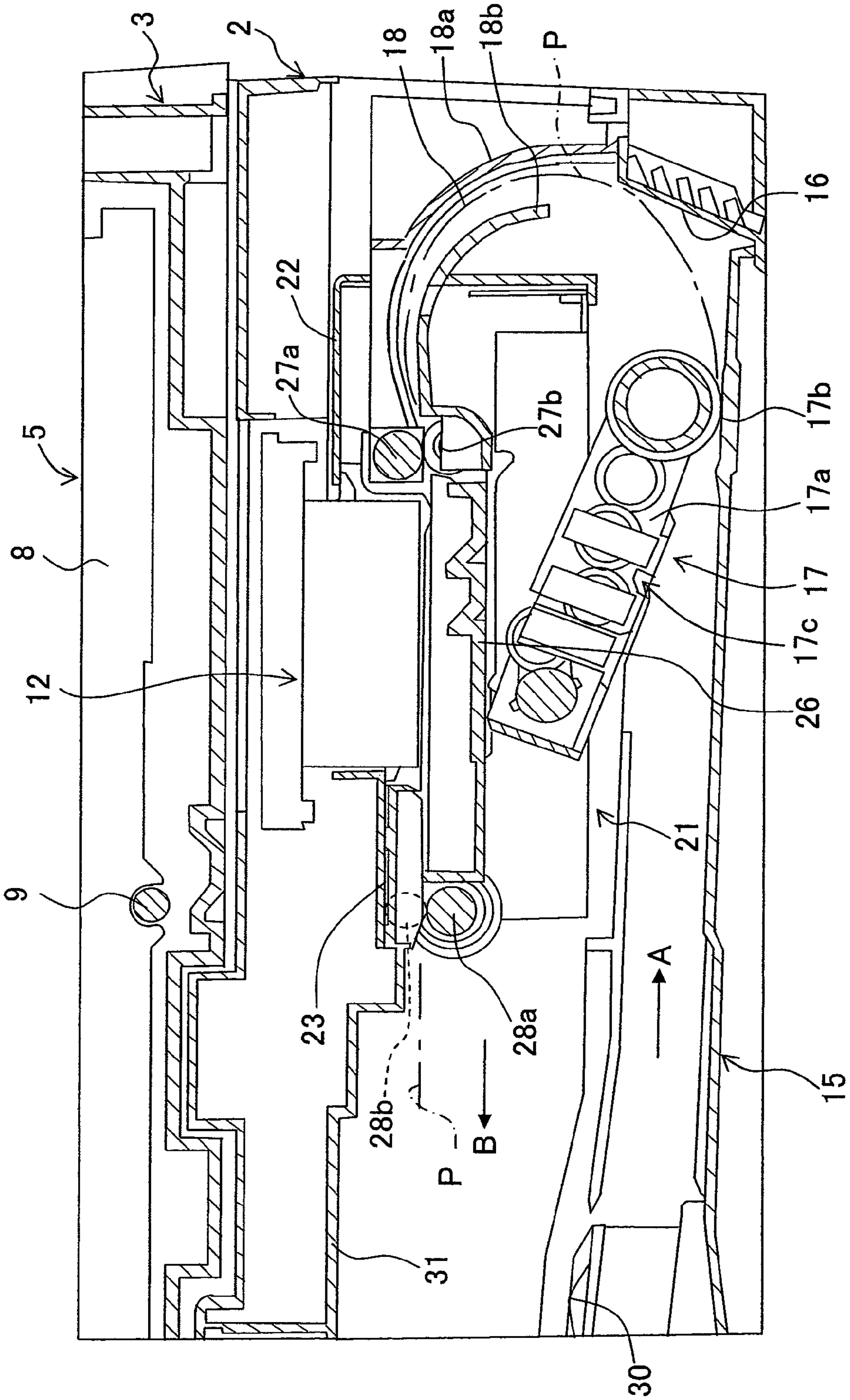
FIG. 5 is an enlarged sectional side view of a main portion of the image recording apparatus, showing its recording section and paper feeding section.

The upper body 3 has an image reading unit 5 incorporated in the upper body 3 for the copying and faxing functions. The image reading unit 5 is constructed of a glass plate and a contact image sensor (CIS) 8. The upper body 3 also has a paper (document) cover 7. With the paper cover 7 opened upward, a paper (document) can be placed on the glass plate. The contact image sensor 8 is displaced below the glass plate and reads an image on the paper placed on the glass plate. With reference to FIG. 5, the contact image sensor 8 is arranged to be reciprocapable along a guide rod 9 extending in a direction orthogonal to the sheet surface of FIG. 5 (primary scanning directions, a direction along the Y axis in FIGS. 1 and 2). The rear end of the paper cover 7, which covers the upper surface of the image reading unit 5, is hinged to the rear end of the upper body 3 so that the cover 7 can pivot up and down around its rear end.

The lower body 2 has an ink storage section 11 formed on one of its right and left sides (the right side in FIG. 2, which is farthest from the pivot axis 4). The storage section 11 is open at its top and stores ink cartridges (not shown) for different colors. In this embodiment, the storage section 11 stores ink cartridges containing black (BK), cyan (C), magenta (M) and yellow (Y) inks. The ink cartridges are connected through flexible supply tubes to an ink jet recording head 14 in a recording section 12, which will be described later on.

Figure 3:
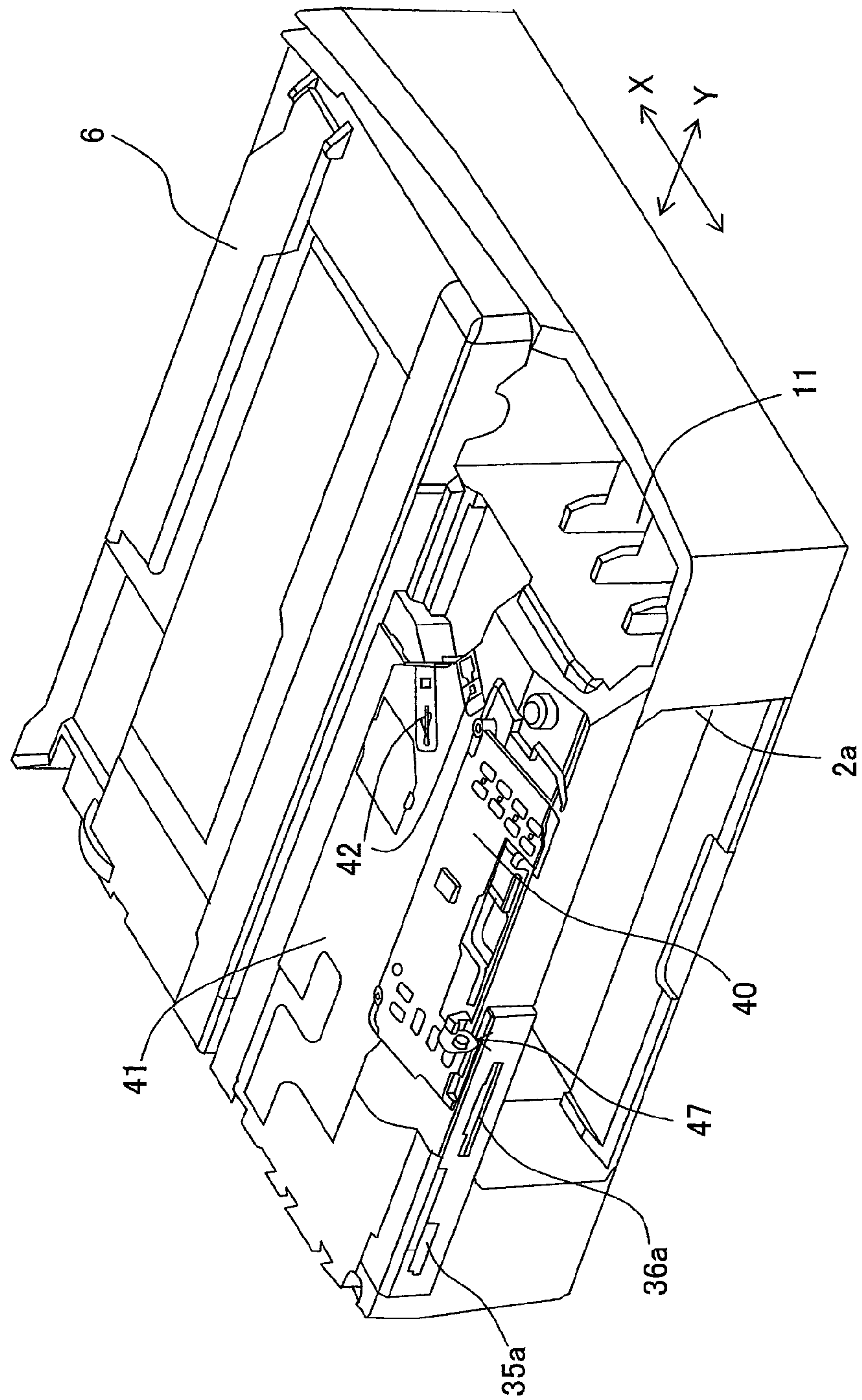
FIG. 3 is a perspective view showing a state in which an upper cover 41 and a switch board 40 are mounted on the upper surface of the lower body.

With reference to FIG. 5, sheets of paper P are piled in a feed cassette 15 positioned detachably in the bottom portion of the lower body 2. The feed cassette 15 is inserted through the opening 2*a* on the forward side (front side) of the lower body 2. In FIGS. 1 and 3, the feed cassette 15 is detached. In this embodiment, sheets of paper P as recording media can be piled in the feed cassette 15, with their short sides (width) extending in a direction (primary scanning direction, direction along the Y axis) orthogonal to the paper feeding direction (direction indicated by an arrow "A"). The sheets P may be cut sheets of A4 size, letter size, legal size or postcard size, or the like.

An inclined separation plate 16 for sheet separation is arranged behind the feed cassette 15 (on the right side of the cassette 15 in FIG. 5). The separation plate 16 is formed so as to project at a central portion in the width direction of paper P (Y-axis direction) and curves backward toward the right and left sides in the paper feeding direction in a plan view. The separation plate 16 is provided with an elastic sawtooth separation pad (not shown) in its middle portion in the width direction of the sheet P. The leading end of the sheet P come into contact with the separation pad, which facilitates the separation of the sheet P from another sheets P piled in the feed cassette 15.

A paper feed mechanism 17 has a feed arm 17*a*. A base end of the feed arm 17*a* is attached pivotably on the side of the lower body 2 so that the feed arm 17*a* can pivot upwardly and downwardly. A free end of the feed arm 17*a* is provided with a feed roller 17*b*. The feed arm 17*a* is has a gear transmission mechanism 17*c* provided therein. The gear transmissions mechanism 17*c* in the feed arm 17*a* transmits torque from a motive power source (not shown) to the feed roller 17*b*. The feed roller 17*b* and the elastic sawtooth separation pad of the inclined separation plate 16 cooperate to feed the sheets P in the feed cassette 15 separately one after one. A sheet of paper P which is separated so as to move in the feeding direction A is fed through a transporting (conveying) passage 18 including a portion substantially in the shape of a horizontally placed letter "U", to the recording section 12 disposed above the feed cassette 15. The transporting passage 18 is formed between a first transporting path body 18*a* and a second transporting path body 18*b* which define its U-shaped outer and inner peripheries respectively.

As shown in FIG. 5, the recording section 12 is formed between a first guide member 22 and a second guide member 23 which extend along the Y axis (in the primary scanning direction). The guide members 22 and 23 are supported by a main frame 21 in the shape of a box and a pair of side plates, which are positioned on the right and left sides of the frame 21. The first guide member 22 is upstream of the second guide member 23 in a discharging direction (direction indicated by an arrow "B"). The ink jet recording head 14 in the recording section 12 is provided to a carriage 13 supported slidably by the guide members 22 and 23, so that the carriage 13 can reciprocate along the Y axis.

A CR (carriage) motor (not shown) is fixed to the lower surface of the second guide member 23, which is downstream of the first guide member 22 in the discharging direction B. A timing belt (not shown) is arranged on the upper surface of the second guide member 23 such that the timing belt extends in the primary scanning directions (the Y axis direction) over the second guide member 23. The CR motor drives the timing belt, which reciprocates the carriage 13.

With reference to FIG. 5, a flat platen 26, which extends in the Y axis direction so as to face the lower surface of the recording head 14 on the carriage 13, is fixed to the main frame 21 between the guide members 22 and 23.

As shown in FIG. 2, a drive roller 27*a* and a nip roller 27*b*, as a transporting (resist) roller pair, are arranged on an upstream the side, of the platen 26, in the discharging direction (direction indicated by an arrow "B"). The conveying roller pair transports a sheet of paper P to a position below the recording head 14. As described above, the conveying roller pair is constructed of the drive roller 27*a* and the nip roller 27*b* which is positioned below the drive roller 27*a* and biased against it. A discharge roller pair, constructed of a discharge roller 28*a* and a spur roller 28*b*, is arranged on a downstream side, of the platen 26, in the discharging direction (direction B). The discharge roller 28*a* is driven to transport, in the discharging direction B, the sheet P moving from the recording section 12. The spur roller 28*b* is positioned over the discharge roller 28*a*.

A sheet of paper P with an image recorded on a side thereof in the recording section 12 is discharged, with this recorded side facing upward, to a discharge tray 30 provided over the feed cassette 15. The discharge tray 30 communicates with a discharge port 30*a* formed in common with the opening 2*a* on the front side of the lower body 2. With reference to FIG. 5, a partition plate (lower cover) 31 made of a synthetic resin is formed integrally with the lower body 2. The partition plate 31 extends to cover a portion above the discharge tray 30, between the lower surface of the guide member 23 disposed in the downstream in the discharge direction B and the discharge port 30*a* on the front side of the lower body 2.

Figure 4:
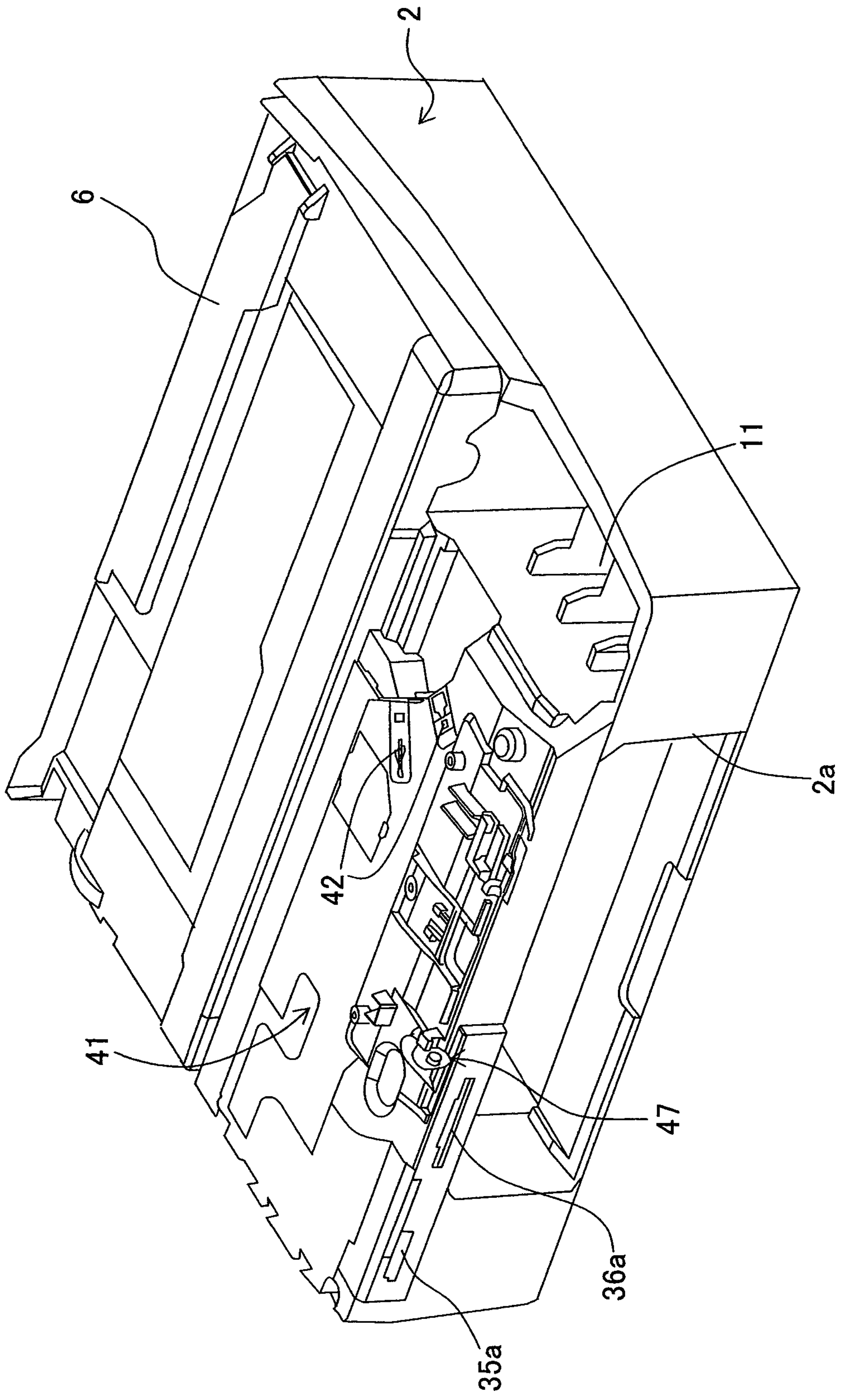
FIG. 4 is a perspective view of the lower body from which the switch board 40 is removed.
Figure 6:
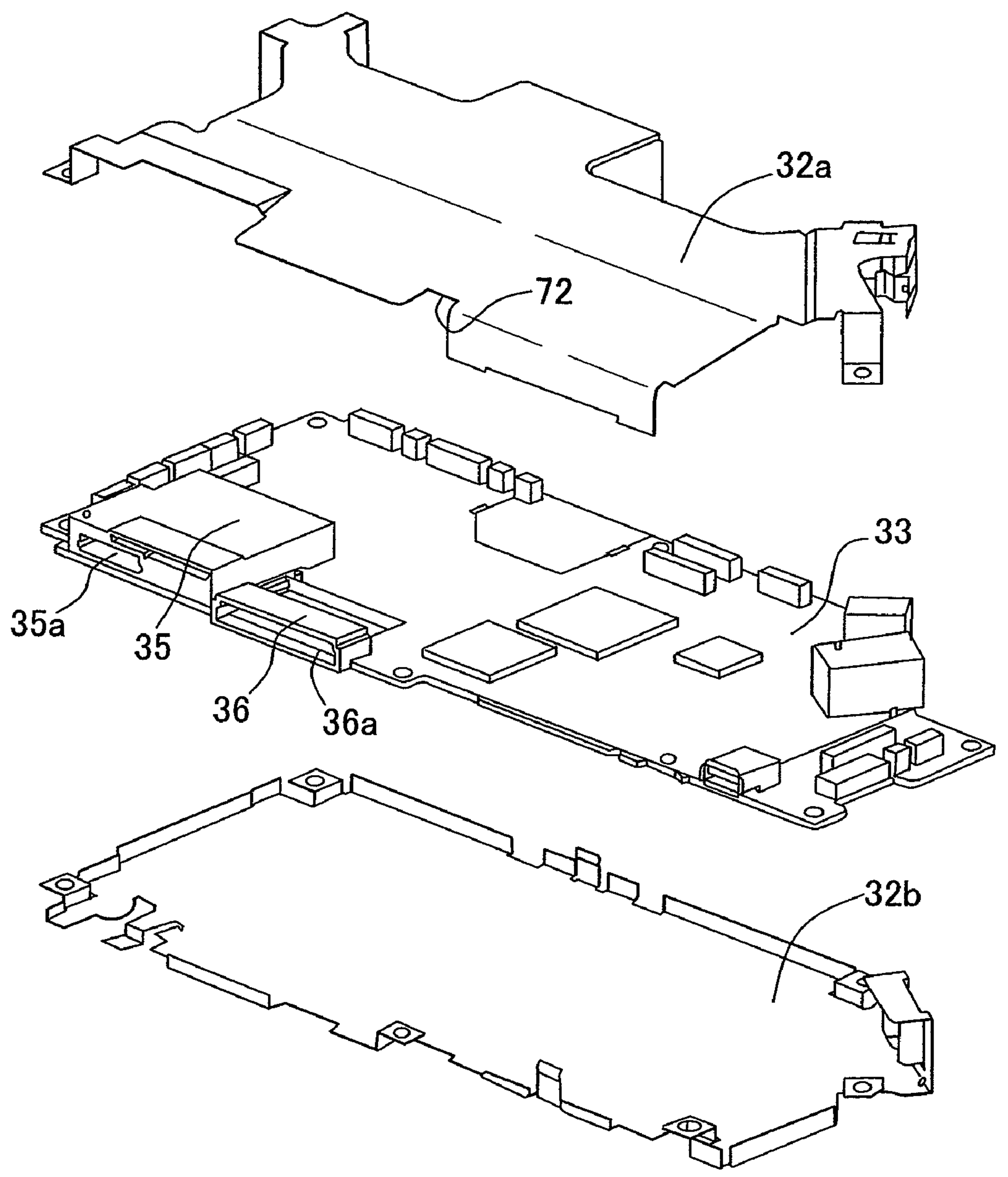
FIG. 6 is a perspective view in a state that a shield case and a main control board of the image recording apparatus are exploded.
Figure 7:
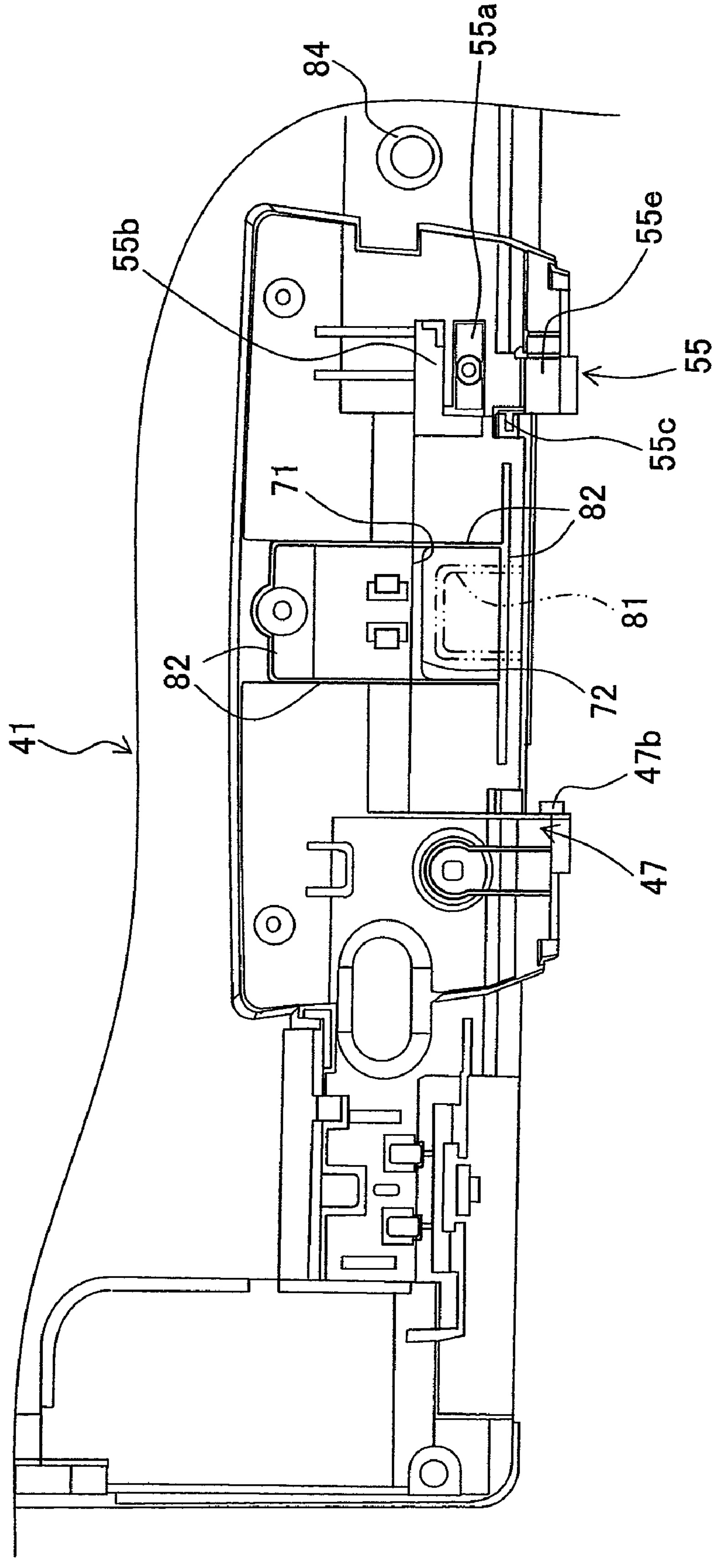
FIG. 7 is a plan view of a main portion of the upper cover of the image recording apparatus.

With reference to FIGS. 3 and 4, a main control board 33 for the recording section 12, facsimile communication, etc. is arranged on the upper surface of the partition plate 31. With reference to FIG. 6, the control board 33 is covered with a shield case constructing of an upper sheet metal member 32*a* and a lower sheet metal member 32*b* which are made of an iron sheet. The control board 33 is fixed to the lower sheet metal member 32*b* with machine screws. The lower sheet metal member 32*b* is fixed to the partition plate 31 with machine screws. With reference to FIGS. 3, 4 and 7, an upper cover 41 made of synthetic resin is fixed with machine screws to cover a portion over the shield case. An LCD (liquid crystal display) panel unit 37, which will be described later on, is attached pivotably on the upper cover 41. A switch board 40 for a group of operation switches C and a group of operation switches D is fixed to a surface of the upper cover 41. The operation switches C and D are positioned on the right and left sides of the LCD panel unit 37, respectively.

Media connectors 35 and 36 are fixed to the upper surface of the main control board 33 and have slots 35*a* and 36*a* respectively, into which different types of recording media in the form of a card or a thin stick can be inserted. Each of the recording media may be Memory Stick (a registered trademark), Smart Media (a registered trademark), Compact Flash (a registered trademark), SD Memory Card (a registered trademark) or xD Picture Card (a registered trademark). With reference to FIGS. 1 to 4, the connector slots 35*a* and 36*a* are formed on the front side of the lower body 2 and positioned on one of the right and left sides of the LCD panel unit 37 (the display panel unit), which will be described later on.

USB ports 42 for USB connectors for communication with peripheral devices are provided on one or both of the right and left sides of a portion in which the LCD panel unit 37 is arranged. For example, in this embodiment, the USB ports 42 are provided between the vicinity of the ink storage section 11 in the lower body 2 (the right end in FIGS. 2 to 4) and the rear of the LCD panel unit 37.

Figure 18A:
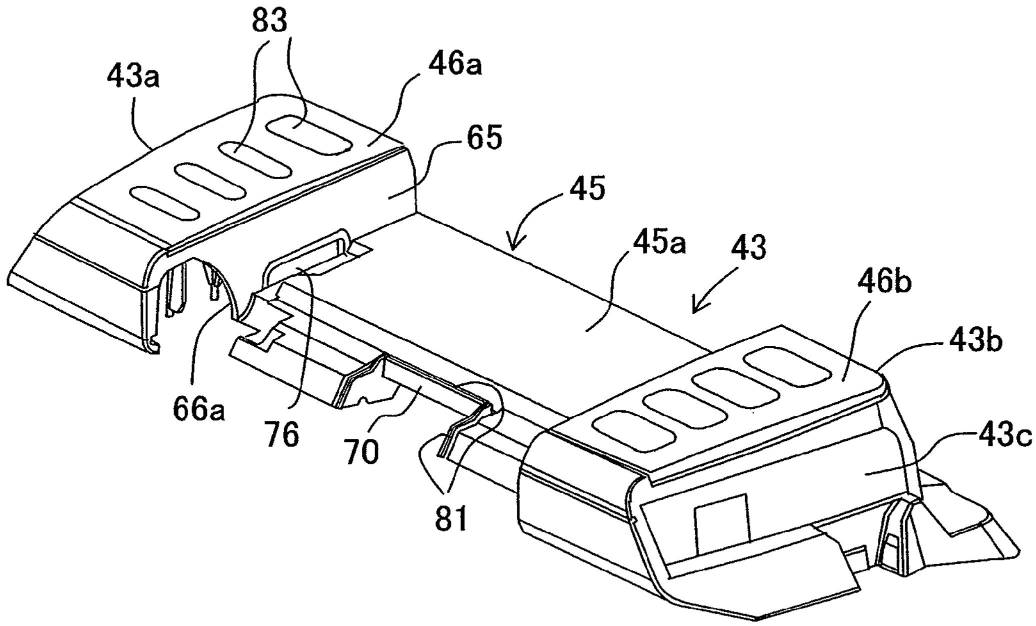
FIG. 18A is a right perspective view showing the upper surface of the display cover.
Figure 18B:
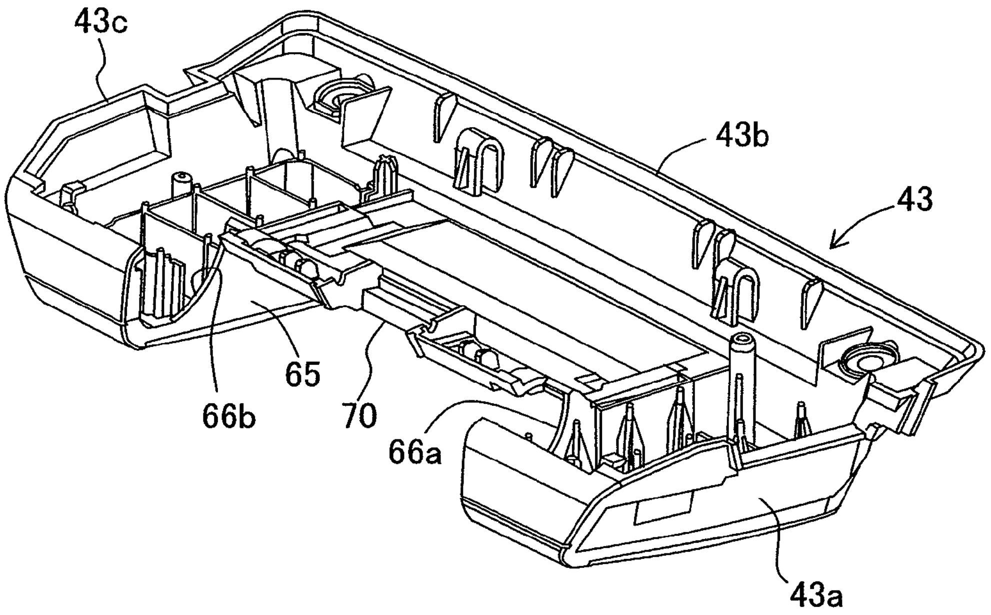
FIG. 18B is a bottom perspective view of the display cover.
Figure 19:
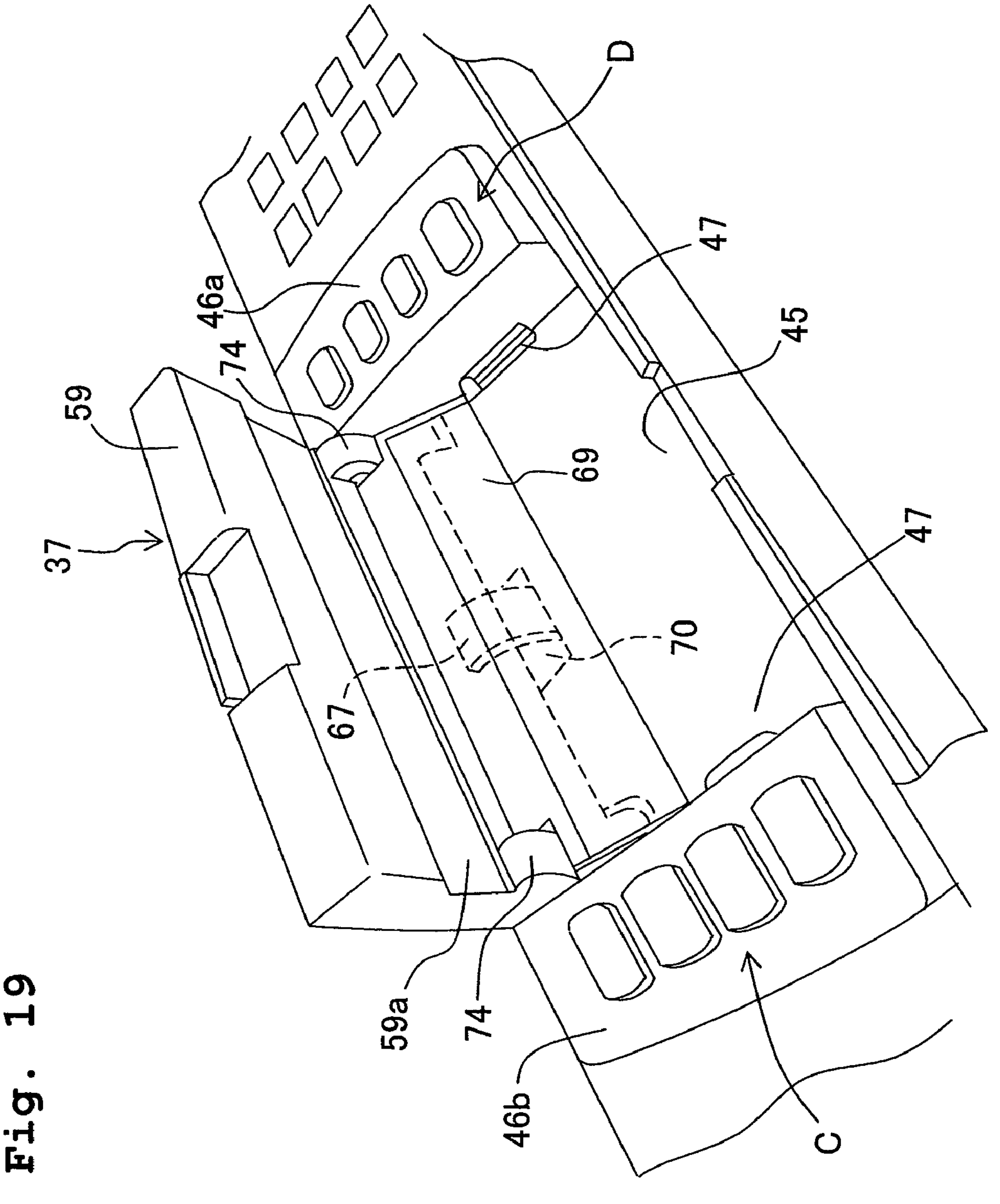
FIG. 19 is a perspective view of the LCD panel unit viewed from the back surface thereof in a state that the LCD panel unit is erected in a roughly vertical posture.

Next, the arrangement of and the mounting (attaching) structure for the LCD panel unit 37 will be described below. In the embodiment shown in FIGS. 1 and 2, the upper body 3 is so connected to the lower body 2 as to pivot up and down on the pivot axis on one of the right and left sides (the left side in FIG. 1) of the lower body 2. The display cover 43 is arranged detachably to the upper cover 41 and positioned near the front edge of the upper surface of the lower body 2 at a substantially central portion in the Y axis direction (in right and left direction of the recording apparatus 1 when a user faces the recording apparatus). Namely, these covers 41 and 43 have engaging mechanisms such as elastic engaging nails (claws) for fixing them together. As shown in FIGS. 18 and 19, the display cover 43, which is an injection molding of synthetic resin, includes entry key arrangement sections 46*a* and 46*b* rising integrally on its right and left sides respectively. The display cover 43 has an accommodation recess 45 formed between the entry key arrangement sections 46_a_ and 46_b_. The accommodation recess 45 is open at its top and front. The LCD panel unit 37 can be accommodated in the accommodation recess 45. The entry key arrangement sections 46_a_ and 46_b_, which are substantially rectangular in plan view, are provided with groups of operation switches C and D, which are entry keys for different functions. The group of operation switches C, disposed on the right as seen from the front of the recording apparatus 1, are entry keys which can be pressed selectively to display each of the functions. The group of operation switches C may be a photo capture entry key C1, a copy entry key C2, a facsimile entry key C3 and a scanner entry key C4, which are arranged in vertical arrays.

With reference to FIGS. 1 and 2, the upper body 3 has an opening 44 in the shape of a cutout formed in a front portion of its upper surface. The opening 44 enables the display screen of the LCD panel unit 37, the surfaces of the entry key arrangement sections 46_a_ and 46_b_, and the groups of operation switches C and D to be exposed visibly when the upper body 3 is closed by pivoting on the pivot axis (on the left side in FIG. 1) toward the upper surface of the lower body 2. In this embodiment, the opening 44 has a shape of "]" (bracket) which is rectangular in plan view and open at its front side.

The upper surface of the upper body 3 is provided with operation panel switches E and F on the right and lefts sides, respectively, of the opening 44. The operation panel switches E and F are entry keys which can be pressed to instruct and display functions of the image recording apparatus 1, and which have different functions. In this embodiment, as shown in FIGS. 1 and 2, the operation panel switches E and F are positioned on the right and left sides respectively of the opening 44. The operation panel switches E are a start/stop entry key, a color copy start entry key, and a monochromatic copy start entry key, which are arranged in vertical arrays. The upper body 3 is also provided with a cross toggle entry key on the left side of the operation panel switches E, as shown in FIGS. 1 and 2. The cross toggle entry key can be pressed to search the fax numbers registered in advance, adjust the volume on the telephone receiver of the image recording apparatus 1, and the like. The operation panel switches F are ten keys for the entry of fax numbers etc., a management report output key, a fax number re-dialing entry key, etc.

Figure 17A:
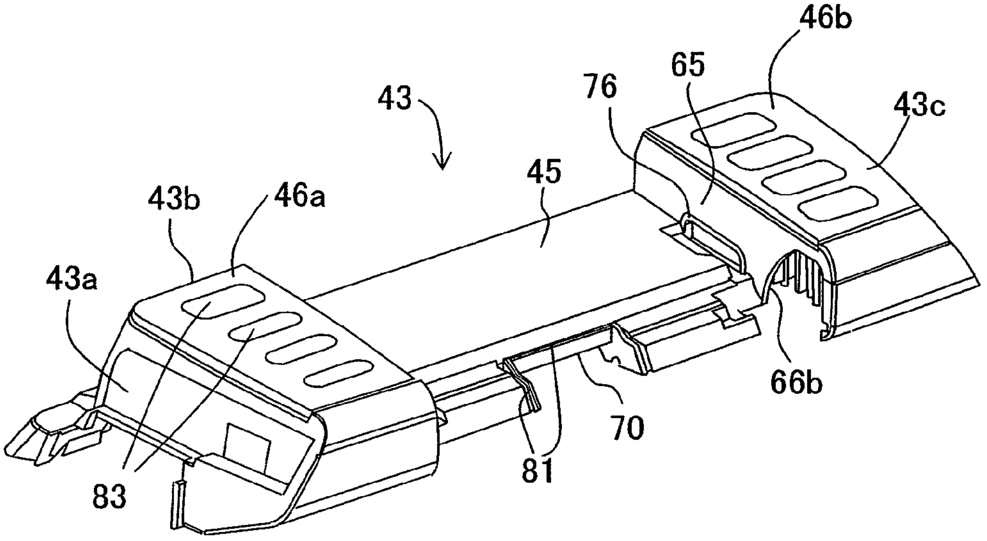
FIG. 17A is a left perspective view showing an upper surface of the display cover.
Figure 17B:
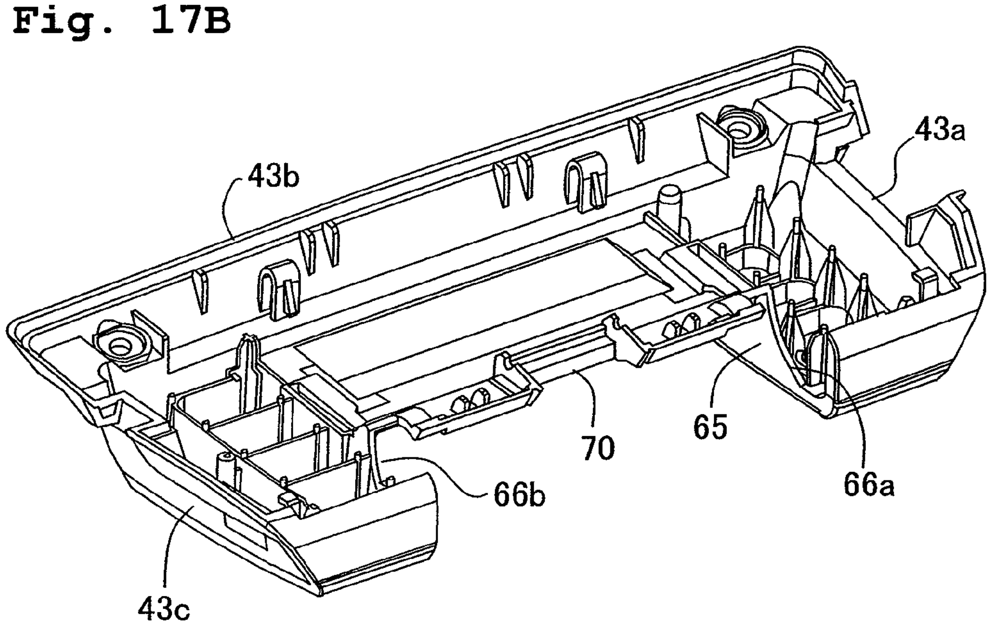
FIG. 17B is a bottom perspective view of the display cover.

With reference to FIGS. 2, 17 and 18, three sides 43_a_, 43_b_, 43_c_ of the display cover 43 and three sides 44_a_, 44_b_, 44_c_ of the opening 44 are formed to be trapezoidal, inclined outward toward the bottom of the image recording apparatus 1 so that, when the upper body 3 closes relative to the lower body 2, an operator's fingers would not be pinched between sharp edges at the places where the sides 44_a_, 44_b_ and 44_c_ of the opening 44 move close to the free edges of the LCD panel unit 37 and the sides 43_a_, 43_b_ and 43_c_ of the display cover 43.

With reference to FIG. 2, the groups of operation switches C and D are positioned at the entry key arrangement sections 46_a_ and 46_b_ as allowance areas, between which the LCD panel unit 37 is positioned. This prevents the three sides 44_a_, 44_b_ and 44_c_ of the opening 44 from interfering with the LCD panel unit 37 when the upper body 3 opens and closes relative to the lower body 2, with the LCD panel unit 37 erected upright so as to face the user's side.

Figure 8:
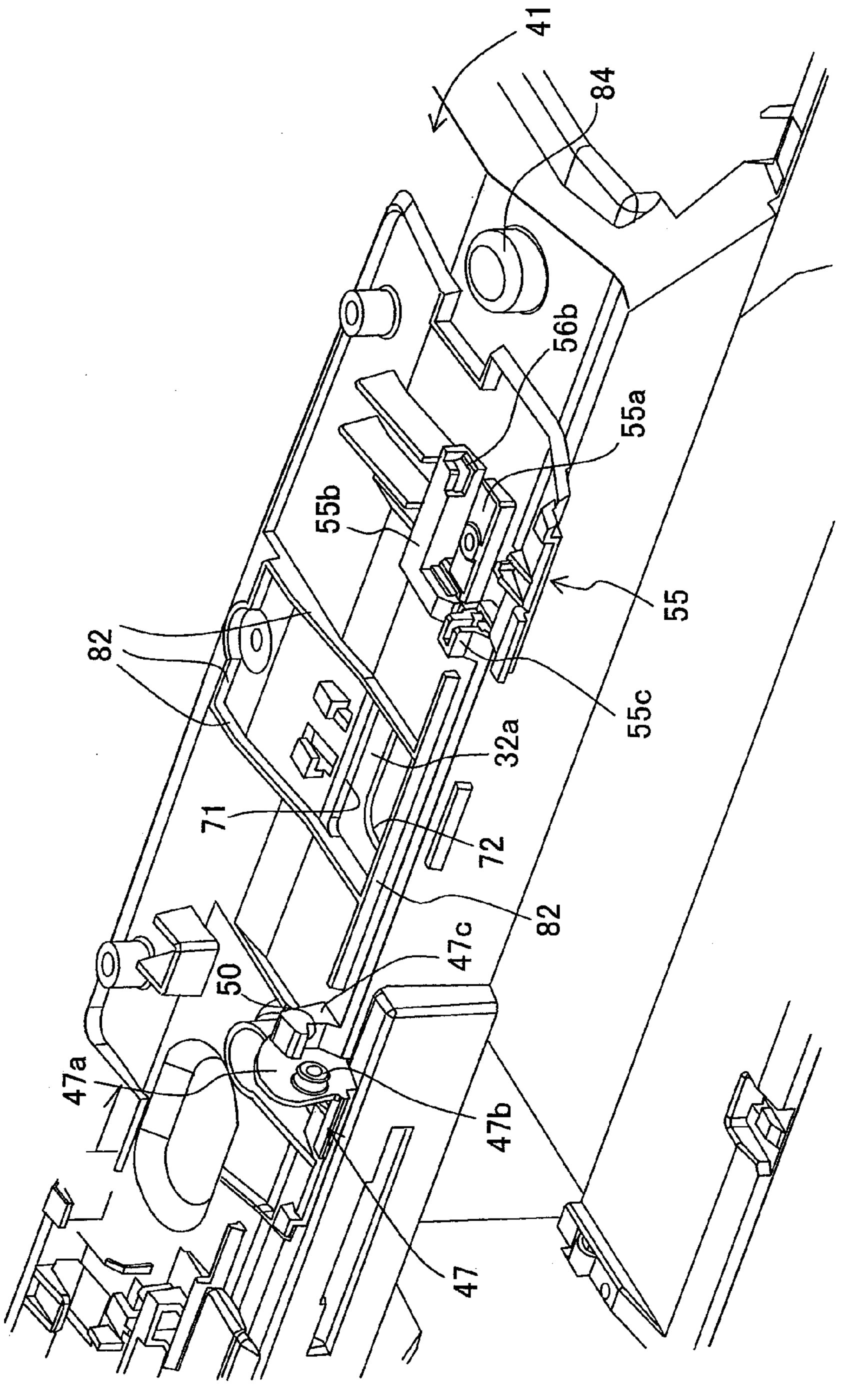
FIG. 8 is a partially cut-out enlarged perspective view of the main portion of the upper cover.
Figure 9B:
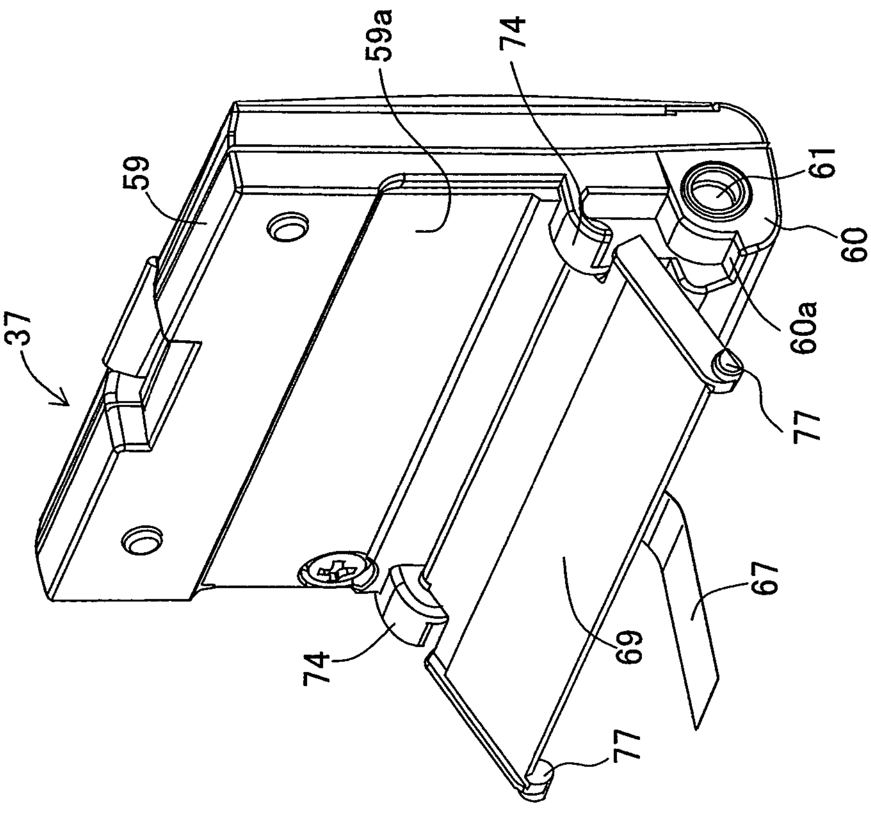
FIGS. 9A and 9B are back perspective views of a LCD panel unit of the image recording apparatus.
Figure 9A:
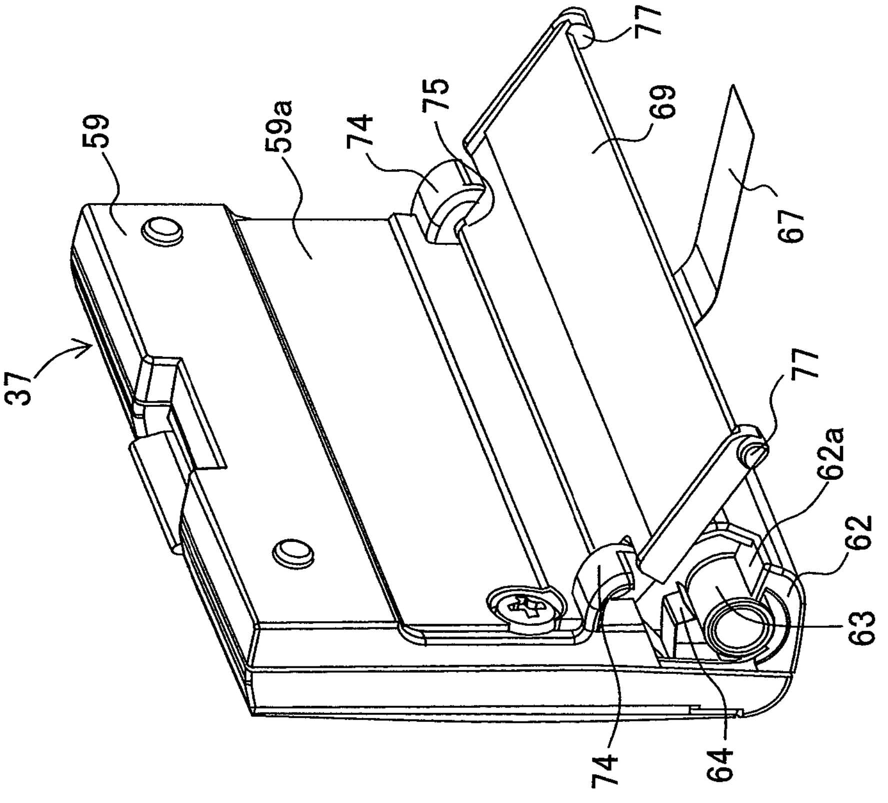
Figure 10A:
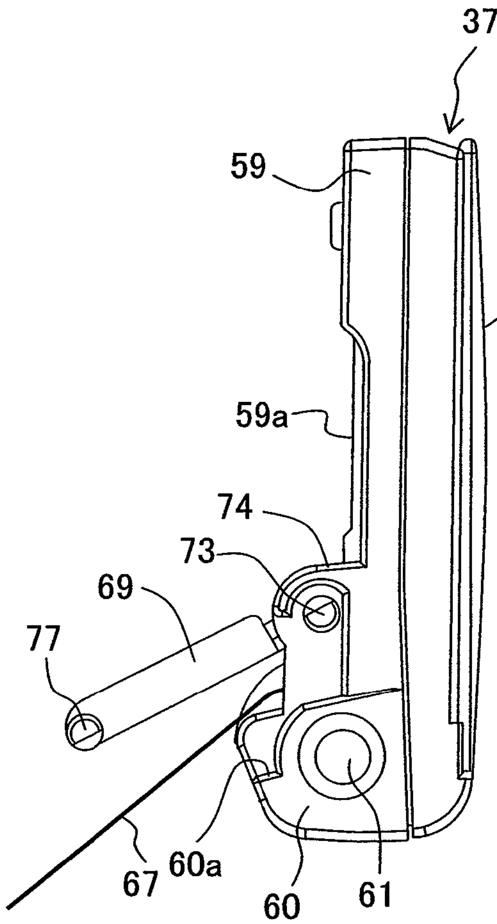
FIGS. 10A and 10B are a right side view and a left side view respectively of the LCD panel unit.
Figure 10B:
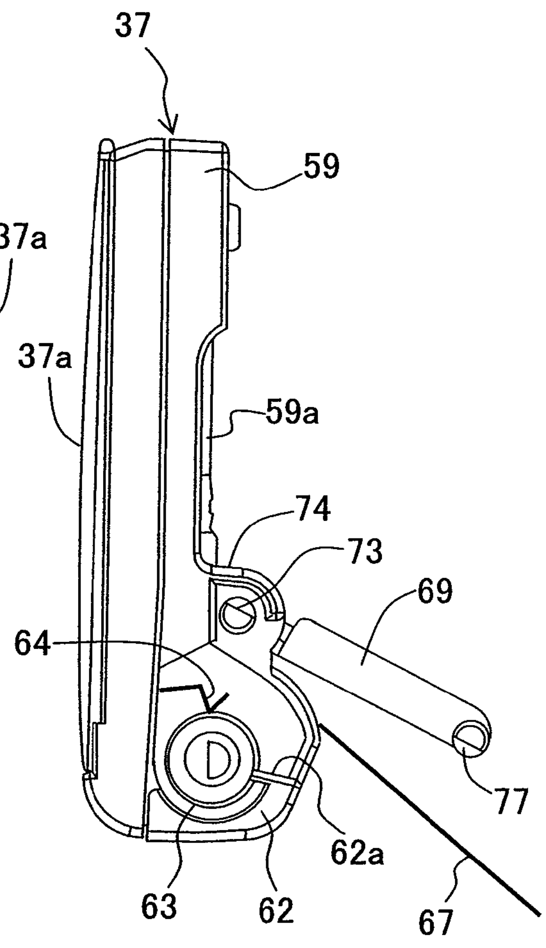
Figure 16:
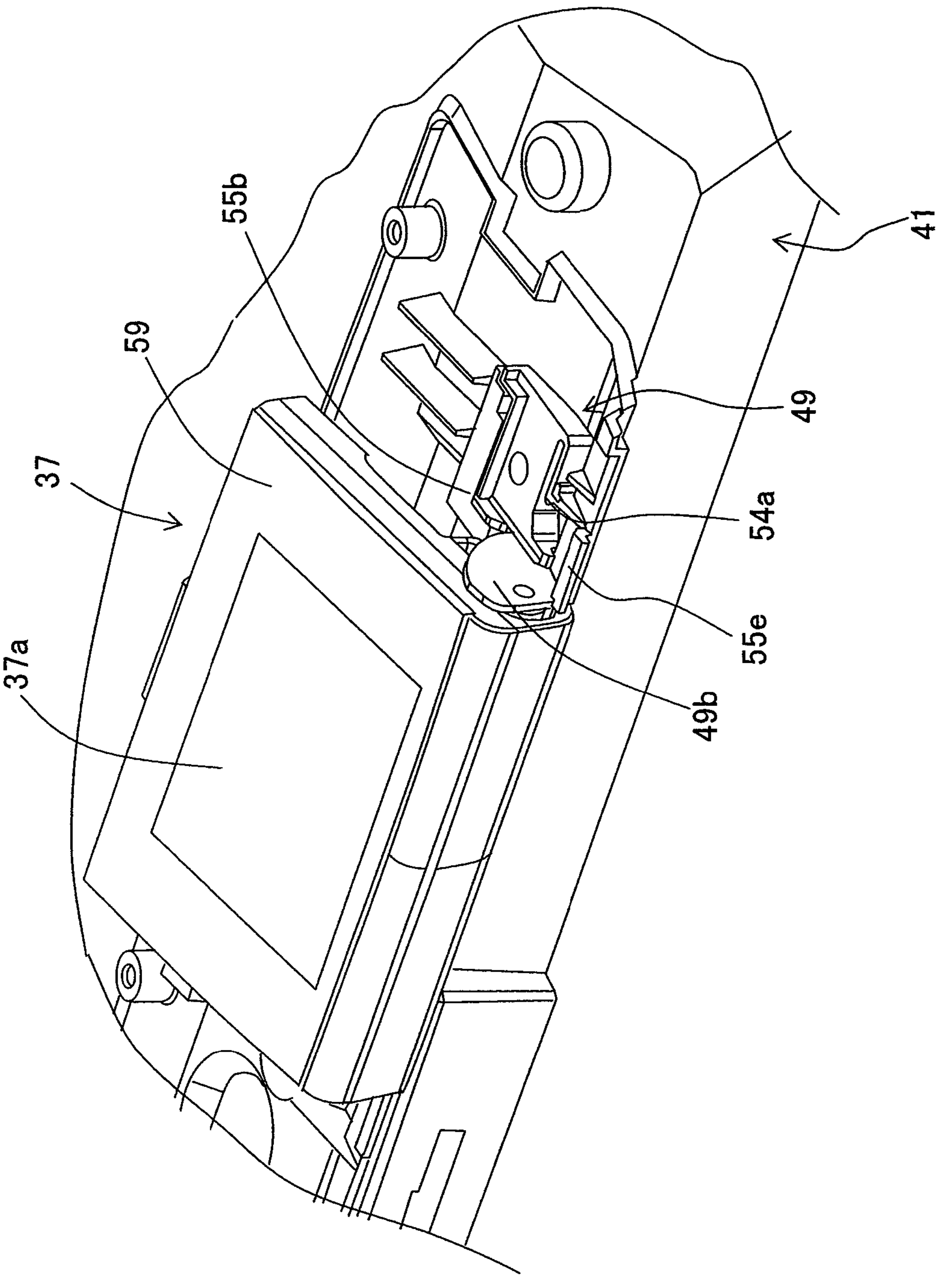
FIG. 16 is perspective view showing a state in which the movable hinge is attached to a portion on one side of the LCD panel unit.

With reference to FIGS. 8 and 16, the base end (the front end) of the LCD panel unit 37 is supported by a hinge member (the pair of hinges) pair constructed of a right (left in FIGS. 8 and 16) hinge 47 and a left hinge 49 so that the LCD panel unit 37 can pivot around the base end. The LCD panel unit 37 is constructed such that the LCD panel unit 37 can pivot between an upright posture (position) and a laid-down posture (position) in which its display screen is substantially parallel with the upper surface of the display cover 43. The LCD panel unit 37 can be held in the laid-down and upright postures and inclined postures (positions) at suitable intervals between the two postures.

Figure 11:
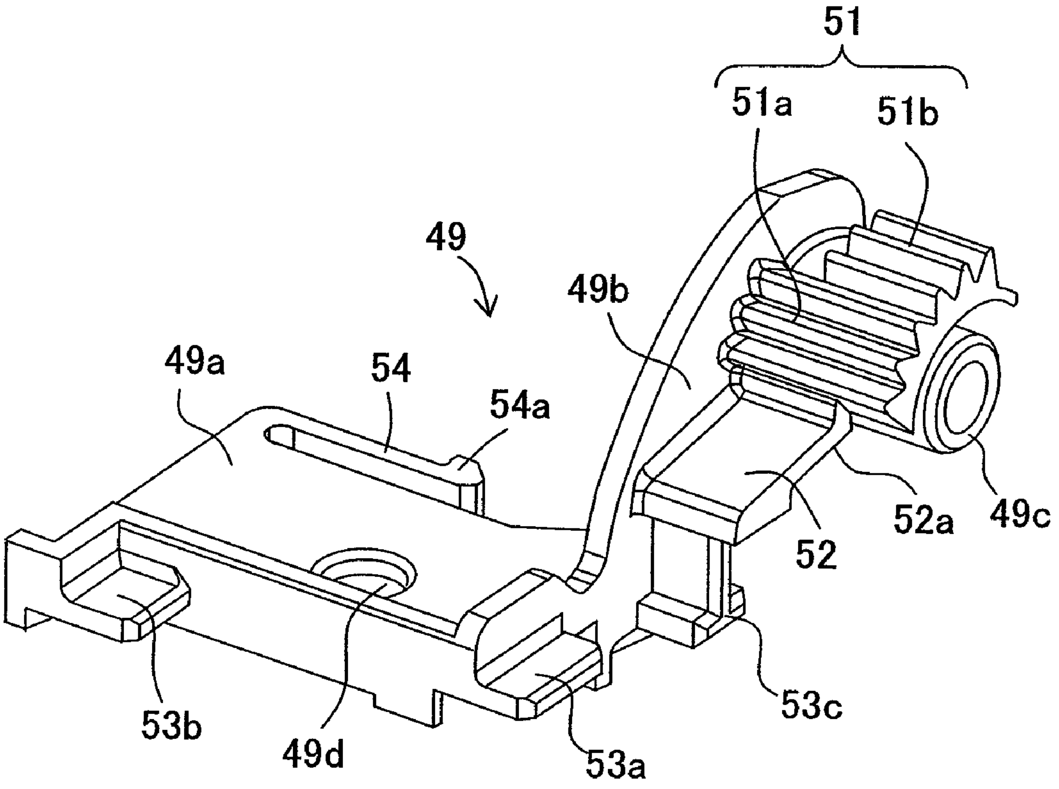
FIG. 11 is a perspective view of a movable hinge of the image recording apparatus.
Figures 12A, 12B, 12C, 12D:
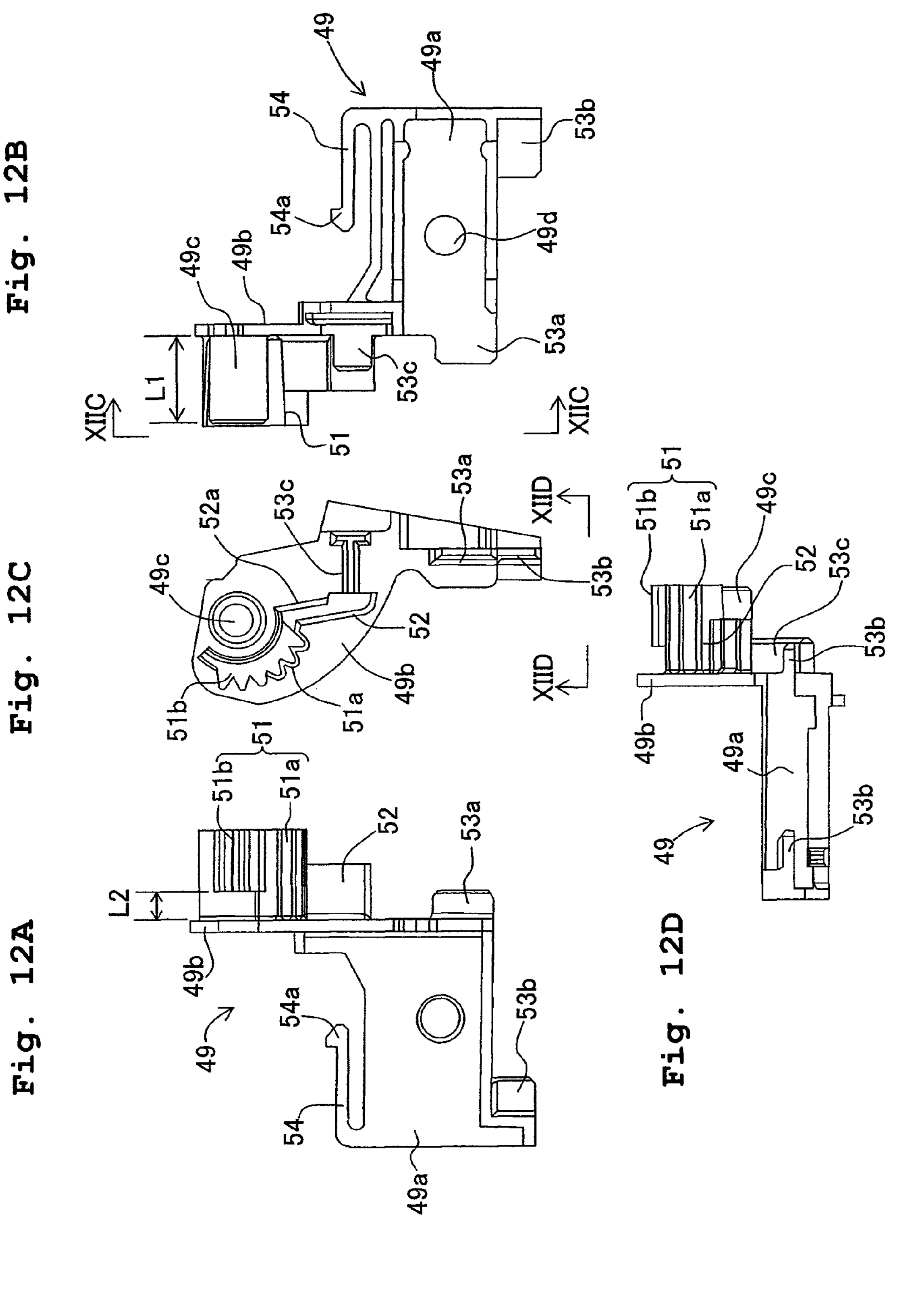
FIGS. 12A and 12B are a top view and a bottom view respectively of the movable hinge.
FIG. 12C is a side view taken along line XIIc-XIIc in FIG. 12B.
FIG. 12D is a view taken along line XIId-XIId in FIG. 12C.

The structure for attaching the LCD panel unit 37 pivotably will be described below in detail. As shown in FIGS. 4, 7 and 8, the hinge 47 of the pair, which is be referred hereinafter to as "fixed hinge 47", is formed integrally on the upper surface, of the upper cover 41, at a position near its front edge. With reference to FIGS. 11, 12 and 16, the hinge 49 of the pair, which is referred hereinafter to as "movable hinge 49", is attached detachably to the upper cover 41.

With reference to FIG. 8, the fixed hinge 47 has a flange 47_a_ in the form of a plate, a cylindrical pin (axis) 47_b_, and a support 47_c_. The flange 47_a_ extends (projects) upward from the upper cover 41. The pin 47_b_ extends horizontally along the horizontal direction from the flange 47_a_. The support 47_c_ is connected to the flange 47_a_ and has a contact part 50 which is formed to protrude to the lower surface on the front side of the lower body 2. The contact part 50 serves as the contact part of a mechanism for preventing the LCD panel unit 37 from pivoting excessively upward.

As shown in FIGS. 11 and 12A-12D, the movable hinge 49, which is an integral injection molding of synthetic resin, has a base 49_a_ in the form of a roughly rectangular block. A vertical flange 49_b_ is formed at one end of the base 49_a_. A cylindrical axis 49_c_ and a latch (latch craw section) 51 extend horizontally from the flange 49_b_ away from the base 49_a_. A length L1 of the axis 49_c_ is roughly twice the length of the pin 47_b_ of the fixed hinge 47. The latch 51 is formed to be fan-shaped (within a range of circular shape) and is positioned outside the cylindrical surface of the axis 49_c_. The latch 51 has a first latch part 51_a_ and a second latch part 52_b_. The first latch part 51_a_ extends from the outer surface of the flange 49_b_ and is equal in length to the axis 49_c_. One end of the second latch part 51_b_ is flush with the outer ends of the first latch part 51_a_ and the axis 49_c_. The other end of the second latch part 51_b_ is spaced at a predetermined length L2 shorter than the length L1 from the outer surface of the flange 49_b_. The second latch part 51_b_ is connected to a flat click-slide part 52.

The base 49_a_ has a first engagement nail 53_a_ and a second engagement nail 53_b_ which are flat. The first engagement nail 53_a_ protrudes horizontally from the front end (near the outer surface of the flange 49_b_) of the base 49_a_. The second engagement nail 53_b_ protrudes horizontally from the rear end of one side of the base 49_a_. A third engagement nail 53_c_ in the shape of an inverted "T" in a sectional view protrudes one side of the lower surface of the click-slide part 52, near the first engagement nail 53_a_. The base 49_a_ also has an elastically deformable elastic part 54 extending from the rear end on other side of the base 49_a_ in the same direction as the second engagement nail 53_b_ protrudes. The elastic part 54 has an anti-disengagement nail 54_a_ formed on its front end. The base 49_a_ further has a hole 49_d_ formed therethrough for engaging with a machine screw (not shown). The click-slide part 52 is connected to the upper surface of the third engagement nail 53_c_ in the shape of an inverted T in a sectional view. The lower surface side of the click-slide part 52 serves as the contact part 52_a_ of a mechanism for preventing the LCD panel unit 37 from disengaging upward.

Figure 13:
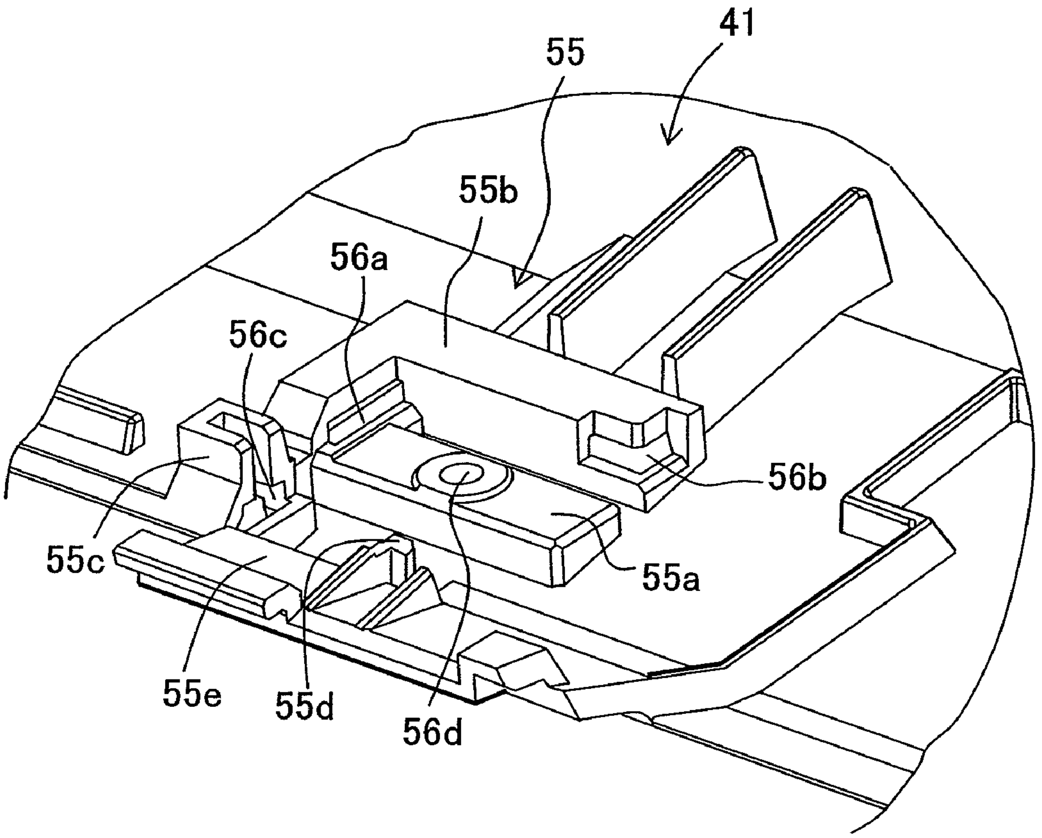
FIG. 13 is an enlarged perspective view of an attachment section to which the movable hinge is to be attached.

The upper cover 41 has an attachment section 55, which enables engagement and disengagement of the movable hinge 49. The structure of the fixing section 55 will be described below. As shown in FIGS. 8 and 13, the fixing section 55 is arranged in a position at which the attachment section 55 faces the fixed hinge 47 and is spaced from the fixed hinge 47 at a distance nearly equal to the width of the LCD panel unit 37. The fixing section 55 includes a placement block 55*a*, a contact block 55*b* L-shaped in plan view, an engagement block 55*c*, and an anti-disengagement block 55*d* which protrude integrally from the upper cover 41. The base 49*a* of the movable hinge 49 is placed on the placement block 55*a*. Side surfaces of the base 49*a* can come into contact with the contact block 55*b*. The placement block 55*a* has a hole 56*d* formed therethrough for engagement with the machine screw mentioned above. The contact block 55*b* has a first contact recess 56*a* and a second contact recess 56*b*, into which the first engagement nail 53*a* and the second engagement nail 53*b* can respectively be inserted to move horizontally, and which prevent them from moving upward. The engagement block 55*c* has a third contact recess 56*c*, into which the third engagement nail 53*c* can be inserted to move horizontally, and which prevents it from moving upward. The contact recesses 56*a*-56*c* correspond to contact parts respectively. The anti-disengagement nail 54*a* can engage with the anti-disengagement block 55*d* in a horizontal direction.

The upper cover 41 has a support block 55*e* protruding integrally from its front edge and positioned forward from the anti-disengagement block 55*d*. The support block 55*e* can contact and support the lower end surface of the flange 49*b* of the movable hinge 49.

The structure of the LCD panel unit 37 will be described below. As shown in FIGS. 9A, 9B, 10A, 10B, etc., the LCD panel unit 37 has a case 59 which is roughly rectangular in front view. A display screen 37*a* is formed on the front surface of the case 59 and has a display area (about 42 mm×54 mm in this embodiment) which is also roughly rectangular in front view and is large enough to display a color image. The case 59 has bosses 60 and 62 formed on lower portions of both side surfaces, respectively of the case 59. In this embodiment, the bosses 60 and 62 are formed on the left (FIG. 10A) and right (FIG. 10B) sides respectively of the case 59 when the display screen 37*a* is considered as the front side. The boss 60 has a bearing 61 formed in it in the form of a cylindrical hole, into which the pin 47*b* of the fixed hinge 47 can be inserted. The boss 62 has a bearing 63 formed on it in the form of a cylinder, into which the axis 49*c* of the movable hinge 49 can be inserted. The case 59 is supported pivotably by the inserted pins 47*b* and 49*c*.

Figure 14:
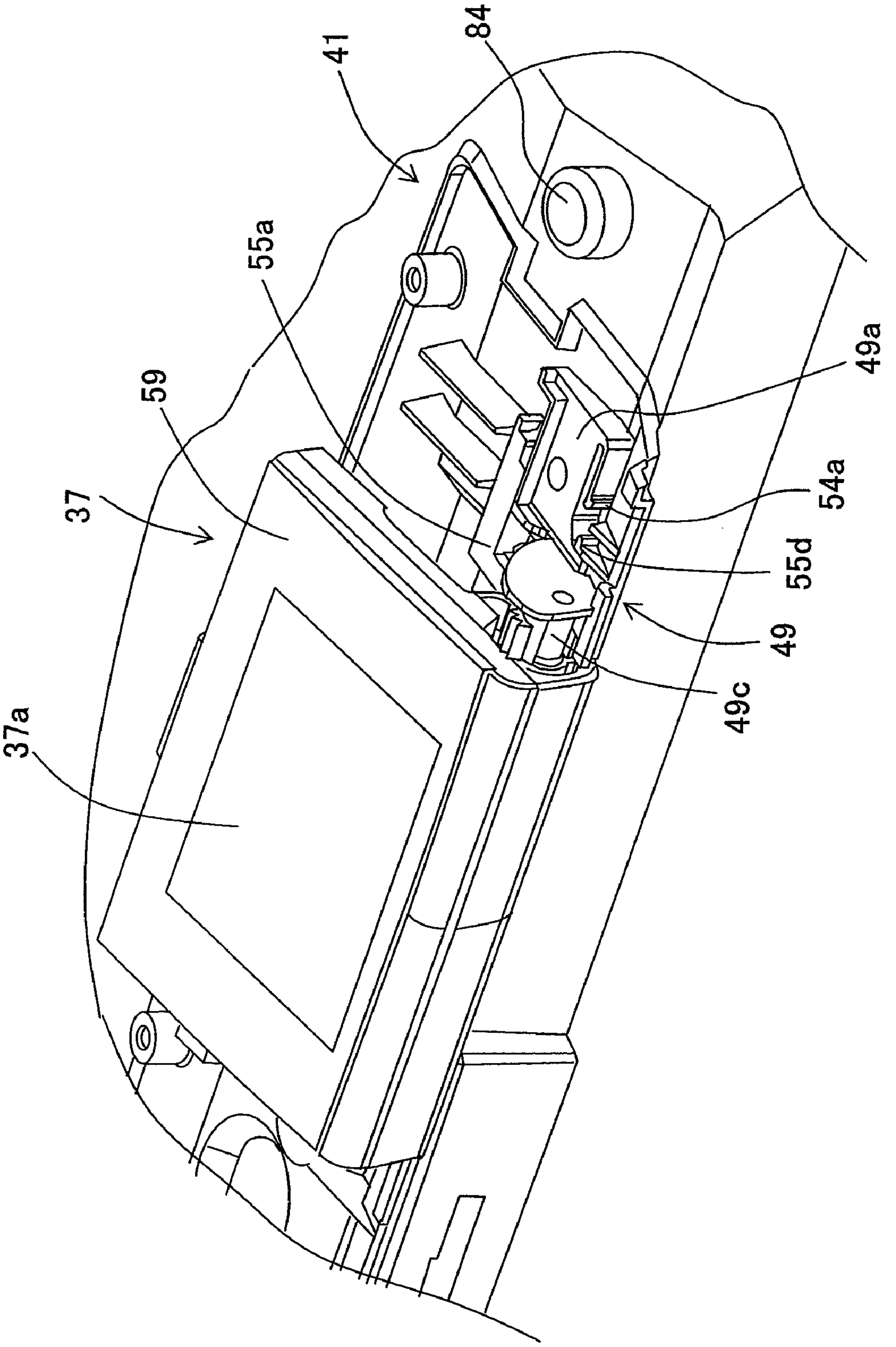
FIG. 14 is a perspective view showing an intermediate state that the movable hinge is being attached.
Figure 15:
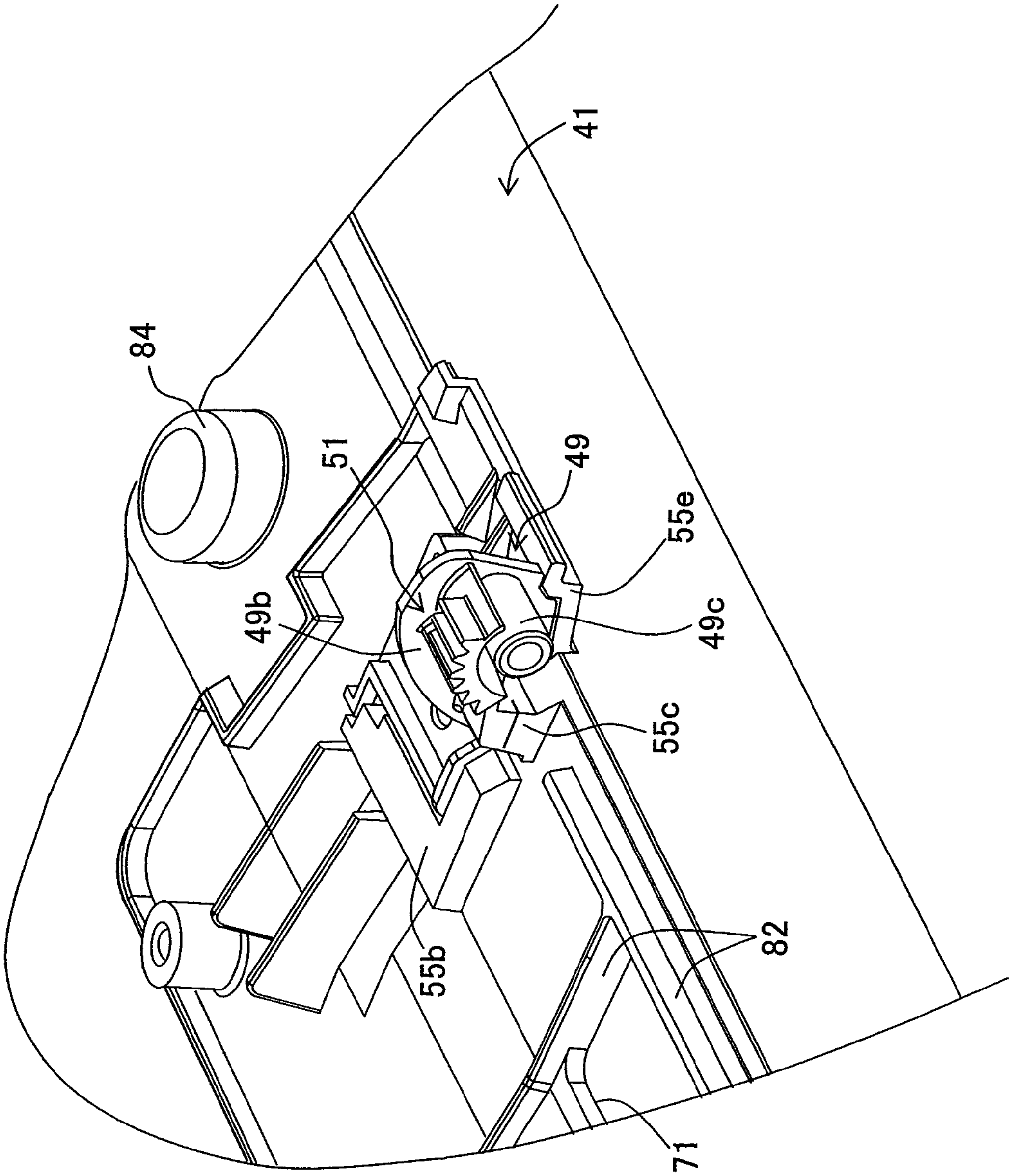
FIG. 15 is perspective view showing a state in which the movable hinge is attached in the attachment section, with the LCD panel unit omitted.

In order that the LCD panel unit 37 can be attached pivotably upwardly and downwardly (in erecting and lying manner) on the hinges 47 and 49, first, the left bearing 61 of the LCD panel unit 37 is brought into engagement with the pin 47*b* of the fixed hinge 47. Subsequently, with reference to FIGS. 13 and 14, the base 49*a* of the movable hinge 49 is placed on a portion of the placement block 55*a* of the attachment section 55. At this time, the movable hinge 49 is so oriented that its axis 49*c* faces the bearing 63 on the right side surface of the LCD panel unit 37. Subsequently, the movable hinge 49 is slid to the left in FIG. 14 (in the direction in which the axis 49*c* approaches the bearing 63), so that the first to third engagement nails 53*a*, 53*b* and 53*c* engage with the first to third contact recesses 56*a*, 56*b* and 56*c*, respectively. The movable hinge 49 is further pushed in this direction, so that the anti-disengagement nail 54*a* comes into compressive contact with the rear end of the anti-disengagement block 55*d*, deforming the elastic part 54 against its elasticity. As a result, the anti-disengagement nail 54*a* engages with the anti-disengagement block 55*d*, so that the movable hinge 49 cannot disengage from the fixing section 55 (FIGS. 15 and 16). For easy understanding, FIG. 15 shows the movable hinge 49 as set on the fixing section 55, with the LCD panel unit 37 removed.

The engagement of the first to third engagement nails 53*a*-53*c* with the first to third contact recesses 56*a*-56*c* completely regulates the upward and downward movement of the movable hinge 49, tightly fixing the movable hinge 49 and firmly attaching the movable hinge 49 to the upper cover 41. The base 49*a* and the placement block 55*a* are fixed together by the machine screw for further reinforcement.

The boss 60 of the LCD panel unit 37 has a stepped portion 60*a* (the engagement part) formed at its one end. The boss 62 of the LCD panel unit 37 has a stepped portion 62*a* (the engagement part) formed at its one end. When the LCD panel unit 37 supported pivotably by the hinges 47 and 49 is substantially in the upright posture, the stepped portions 60*a* and 62*a* are in contact with the contact parts 50 and 52*a* of the hinges 47 and 49 respectively. This regulates the forward pivoting of the LCD panel unit 37 and keeps it from falling away from the image recording apparatus 1. Accordingly, even if a user lifts the LCD panel unit 37, it neither pivots further nor disengages accidentally.

With the LCD panel unit 37 attached between the hinges 47 and 49, as stated above, and erected substantially in the upright posture, the switch board 40 is fixed in a predetermined position on the upper cover 41 (see FIG. 3), and the display cover 43 as shown in FIGS. 17 and 18 is fixed on the rear end side of the LCD panel unit 37. The entry key arrangement sections 46*a* and 46*b* of the display cover 43 have cutouts 66*a* and 66*b* respectively formed through their respective inner walls 65, between which the accommodation recess 45 is formed. The cutouts 66*a* and 66*b* are identical in shape with the edges of the flanges 47*a* and 49*b* of the hinges 47 and 49. The edges of the flanges 47*a* and 49*b* engage closely with the cutouts 66*a* and 66*b* respectively. This keeps the appearance of the image recording apparatus 1 from being spoiled and contributes toward improving the fixing strength of the hinges 47 and 49.

Figure 22:
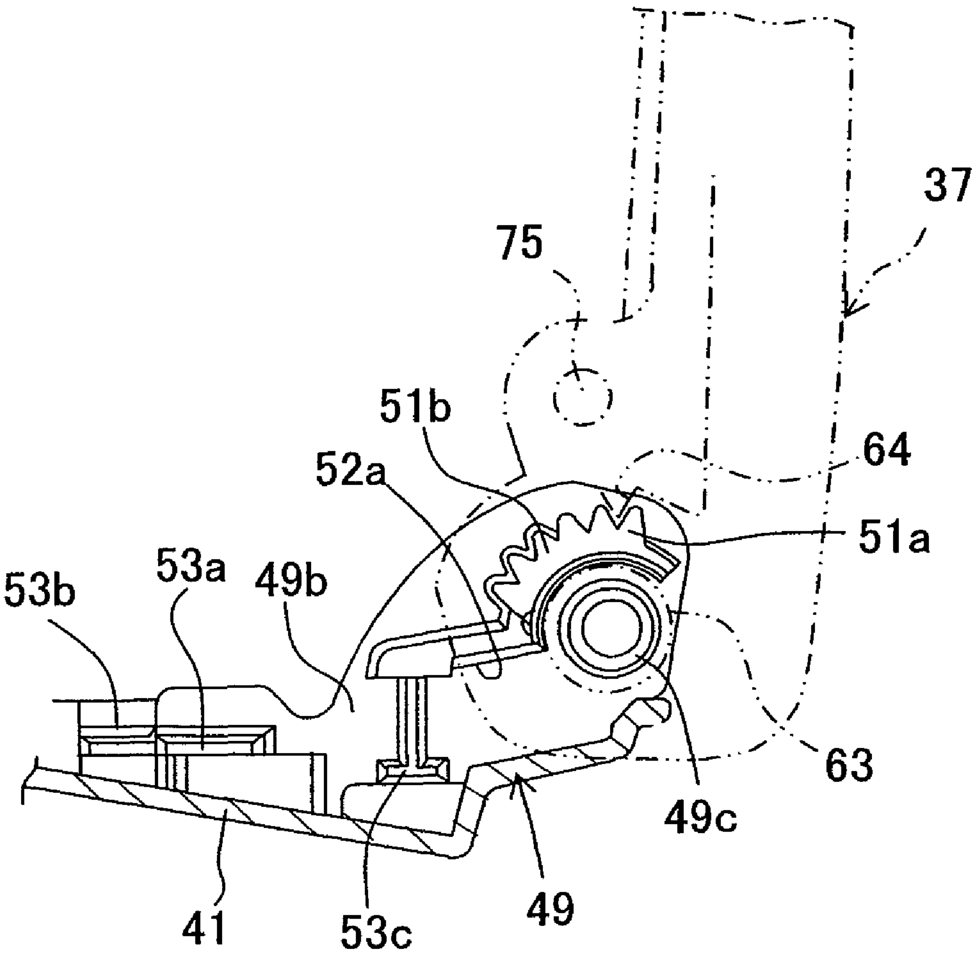
FIG. 22 is a drawing for explaining a state in which the LCD panel unit is in the upright posture as viewed from a side surface of the movable hinge.
Figure 23:
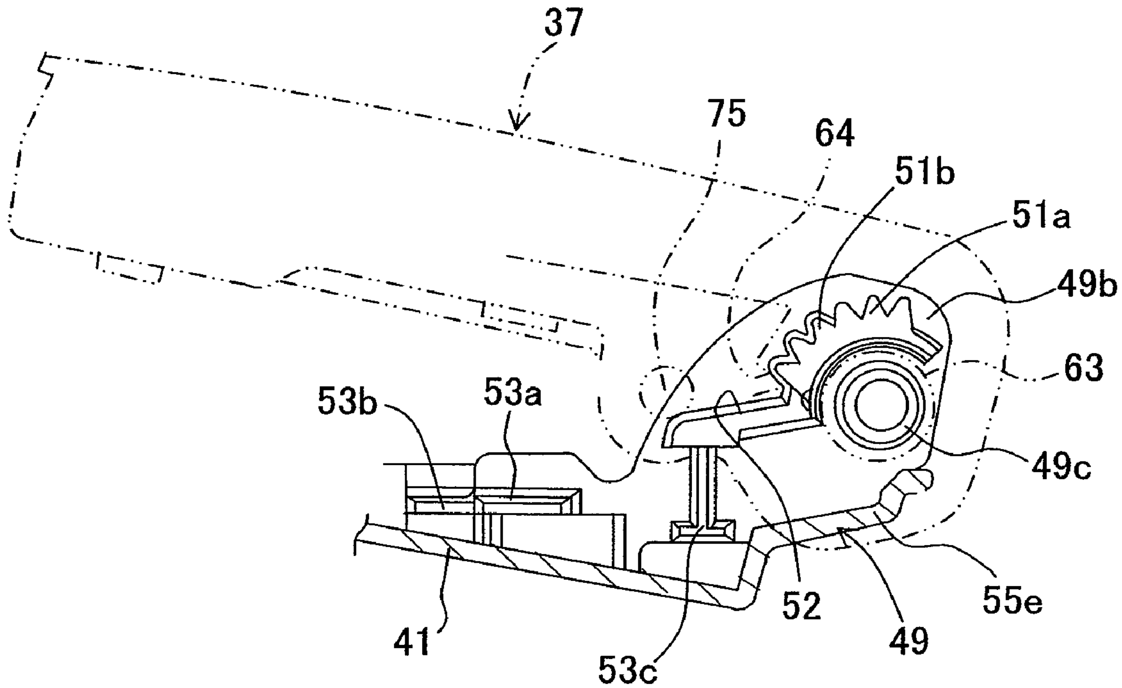
FIG. 23 is a drawing for explaining a state in which the LCD panel unit is in the laid-down posture as viewed from the side surface of the movable hinge.

The case 59 of the LCD panel unit 37 has a click 64 in the form of a metal plate spring, one end (base end) of which is fixed to the other side surface of the case 59 by screws or the like. The free end (tip end portion) of the click 64 is arranged to face a portion of the outer periphery of the bearing 63 of the LCD panel unit 37. With the axis 49*c* of the movable hinge 49 engaging with the bearing 63, the outer periphery of the bearing 63 and the arcuate inner peripheral surface of the latch 51 of the movable hinge 49 face each other. At this time, the click 64 engages elastically with the teeth of one of the latch parts 51*a* and 51*b*. This structure is a latch mechanism. This structure makes it possible to adjust the inclination angle of the LCD panel unit 37 at suitable intervals between the laid-down posture (FIG. 1) in which the display screen of the LCD panel unit 37 is substantially flush with the upper surfaces of the entry key arrangement sections 46*a* and 46*b*, and the upright posture in which the display screen is substantially vertical relative to a horizontal plane. This structure also makes it possible to hold the LCD panel unit 37 in the various postures at these intervals (see FIGS. 2, 22 and 23).

When the posture of the LCD panel unit 37 becomes more like the laid-down posture at which the LCD panel unit 37 is substantially parallel with the bottom plate 45*a* of the accommodation recess 45 of the display cover 43, the click 64 of the LCD panel unit 37 passes over the teeth of the second latch part 51*b* of the movable hinge 49 and reaches (positioned in) the click-slide part 52 of this hinge (see FIG. 23), so that a user can turn the LCD panel unit 37 smoothly without feeling clicking.

A description will be provided below of the structure of the flexible flat (FF) cable 67 at the LCD panel unit 37 and the covering member 69 for protecting the cable.

The FF cable 67 extends outward from a portion in the vicinity of the lower edge in the back surface side of the case 59 of the LCD panel unit 37. With reference to FIGS. 17A-18B, 19, etc., the bottom plate 45*a* of the accommodation recess 45 of the display cover 43 has a first guide opening 70 in the shape of a cutout formed in a shape of "]" in a plan view, on the front side of the display cover 43. With reference to FIGS. 7, 8, 15, etc., the upper cover 41 has a second guide opening 71 in the shape of a roughly rectangular hole formed therethrough so as to overlap with the first guide opening 70 disposed above the second guide opening 71. With reference to FIGS. 6, 7 and 8, the upper sheet metal member 32*a* of the shield case has a third guide opening 72 in the shape of a cutout formed in a shape of "]" in a plan view, on its front side below the second guide opening 71. The FF cable 67 extends (is guided) through these three guide openings 70 to 72 and is connected to the main control board 33 as an electrical component. Signals can be transmitted from the main control board 33 through the FF cable 67 to the LCD panel unit 37 so that images can be displayed on the LCD panel unit 37. The first to third guide openings (guide opening) 70 to 72.

With reference to FIGS. 9A-10B, the covering member 69 is an integral molding of flexible synthetic resin in the form of a flat plate. The covering member 69 has a pair of pivot pins 73 extending outwardly in mutually opposite directions from the base end of the covering member 69. The case 59 of the LCD panel unit 37 has a pair of bosses 74 formed on its back surface above the position where the FF cable 67 extends from the case 59. Each boss 74 has a cylindrical bearing hole 75 formed therethrough, in which one of the pivot pins 73 is supported rotatably.

Figure 20A:
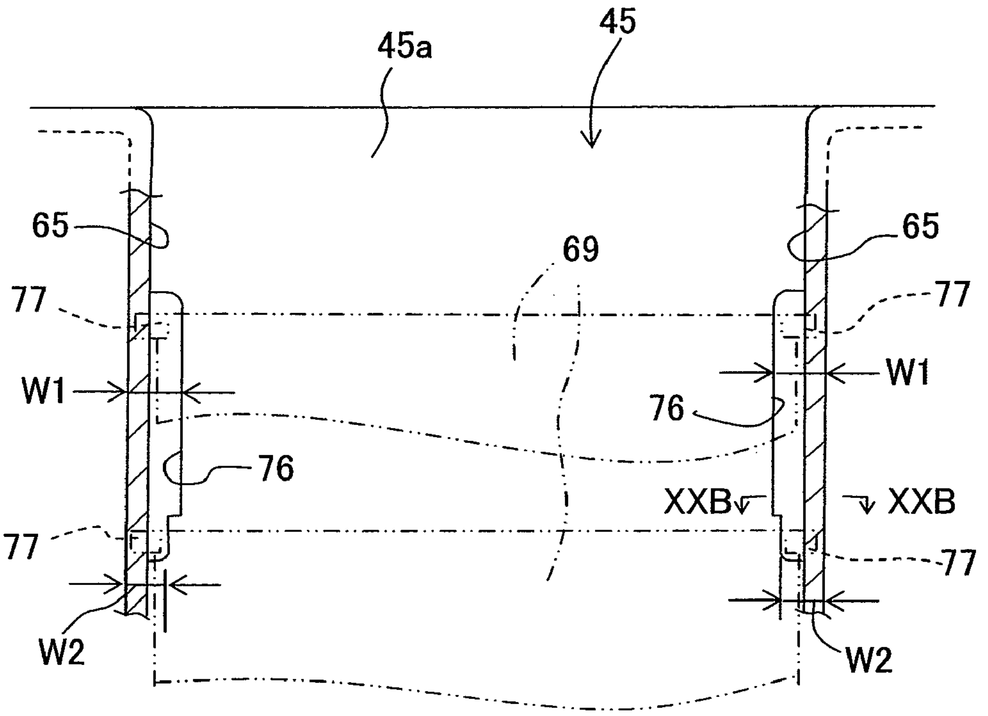
FIG. 20A is a plan view showing the relationship between a covering member and a guide groove.
Figure 20B:
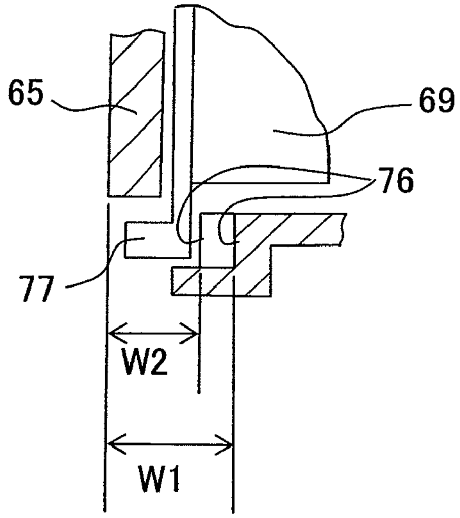
FIG. 20B is an enlarged sectional view taken along line XXb-XXb in FIG. 20A.

With reference to FIGS. 17A-20B, the display cover 41 has a pair of guide grooves 76 each formed in a corner portion between the bottom plate 45*a* of the accommodation recess 45 and the inner wall 65 of one of the entry key arrangement sections 46*a* and 46*b*. The guide grooves 76 extend along the forward and backward direction (X-axis direction) in the lower body 2. As shown in FIGS. 20A and 20B, each of the guide grooves 76 is constructed of a rear side portion and a front end portion. A width W1 of the rear side portion is greater than a width W2 of the front end portion. The covering member 69 has a pair of guide pins 77 extending outwardly in a mutually opposite directions from a second end (hereinafter referred to as "free end") of the covering member 69. Each of the guide pins 77 can slide along one of the guide grooves 76.

Accordingly, when the LCD panel unit 37 assumed a posture in which the LCD panel unit 37 is erected substantially in the upright state (see FIG. 2), as shown in FIG. 19, the covering member 69 is inclined in a downwardly rearward direction (away from the LCD panel unit 37) at about 45 degrees, with its guide pins 77 positioned at the front ends of the guide grooves 76. Accordingly, the FF cable 67 and the first guide opening 70 are positioned between and covered with the back surface of the case 59 of the LCD panel unit 37 and the covering member 69. When the LCD panel unit 37 is laid down in the accommodation recess 45, with the display screen 37*a* being flush with the surfaces of the entry key arrangement sections 46*a* and 46*b*, as shown in FIG. 1, the free end side (the side of the guide pins 77) of the covering member 69 is positioned near the rear ends of the guide grooves 76, with the covering member 69 accommodated substantially in parallel with the back surface of the case 59. This makes the LCD panel unit 37 low in height when it is in the laid-down posture (position). In addition, the covering member 69 does not move into the lower body 2, as is the case with conventional covers which protect FF cables. This makes it unnecessary to preset a vertical space for the covering member 69, so that the image recording apparatus 1 can be compact. In this embodiment, with reference to FIGS. 9A-10B and 19, the case 59 has a recess 59*a* formed on its back surface. When the LCD panel unit 37 is in the laid-down state, the covering member 69 is positioned completely within the recess 59*a*, so that the LCD panel unit 37 is much lower in height. In addition, the FF cable 67 and the first guide opening 70 are positioned between and covered with the back surface of the case 59 and the covering member 69. Thus, the covering member 69, which is mounted on (attached to) the case 59 of the LCD panel unit 37 such that the covering member 69 can be accommodated in the case 59, covers and protects the FF cable 67 and the first guide opening 70, regardless of the angular posture the panel unit 37 is assuming. This prevents users from touching the FF cable 67 carelessly and keeps trash, dust and other foreign bodies from entering the image recording apparatus 1 through the first guide opening 70.

The pivot pins 73 and guide pins 77 of the covering member 69 are roughly semi-cylindrical having a cross-section in which the round axis is partially cut out. Because the covering member 69 is flexible as described above, its middle portion in the left and right direction can be curved so that the distance between the pivot pins 73 and the distance between the guide pins 77 can be shortened. This makes it easy to insert and attach the pins 73 and 77 into the cylindrical bearing holes 75 and the guide grooves 76, respectively. With reference to FIGS. 20A and 20B, the width W2 of the front end portions of the guide grooves 76 is formed to be narrow as described above. Accordingly, when the LCD panel unit 37 is in the upright posture, it is impossible to shorten the distance between the guide pins 77 even if the covering member 69 is curved. This keeps the guide pins 77 from disengaging accidentally from the guide grooves 76.

Figure 21:
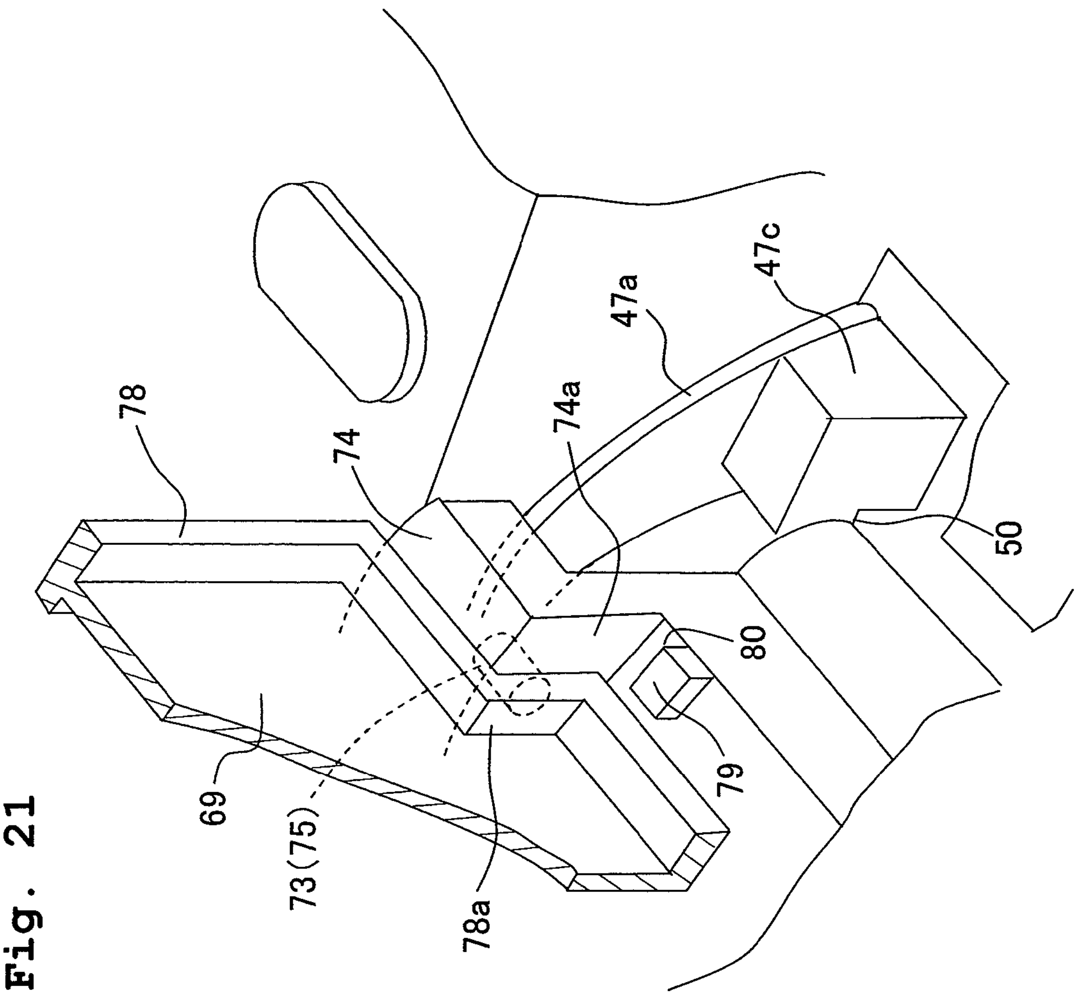
FIG. 21 is a partially cut-out perspective view of the back surface side of a first end (base end) of the covering member.

As shown in FIG. 21, the case 59 has a protrusion 79 formed on its back surface. A gap 80 is formed between the protrusion 79 and a side surface 74*a* of the boss 74 of the case 59. As shown in FIG. 21, the covering member 69 has a rib 78 protrudingly formed integrally on its back surface. The rib 78 include a vertical rib 78*a* formed on the base end side. When the LCD panel unit 37 is erected substantially in the upright state, the rib 78*a* is fit into the gap 80, thereby regulating the distance between the pivot pins 73 from shortening even when the covering member 69 is curved. This keeps the covering member 69 from disengaging accidentally from the case 59.

The bottom plate 45*a* of the accommodation recess 45 of the display cover 43 slopes gently downward toward the front side of the accommodation recess 45. The bottom plate 45*a* is formed with a liquid passage 81 in the form of a bank and/or a groove formed on its upper surface and extending along the three sides of the first guide opening 70, which has substantially a shape of "]" in plan view. Accordingly, even if liquid such as water is spilled on the bottom plate 45*a* or the covering member 69, the liquid passage 81 keeps the liquid from dropping through the first guide opening 70. This prevents electrical components such as the main control board 33 and the like in the image recording apparatus 1 from short-circuiting.

Likewise, as shown in FIGS. 7, 8 and 15, the upper cover 41 has an upper surface sloping gently downward toward its front side. The upper cover 41 also has surrounding ribs 82 formed on its upper surface around the second guide opening 72 and third guide opening 73 in a plan view. Even if liquid drops on the upper cover 41, the surrounding ribs 82 keep the liquid from entering these guide openings 71 and 72. This further improves the short circuit prevention. The liquid passage 81 and the surrounding ribs 82 correspond to "the guide preventing liquid from flowing downward" in the claims.

With reference to FIGS. 2, 7, 8 and 15, the upper cover 41 has a protrusion 84 formed on its upper surface on a side near its end which is away from the pivot axis on which the upper body 3 pivots (on a side away from a position at which the display cover 43 is arranged). When the upper body 3 has a recess (not shown) formed on its under surface with which the protrusion 84 is engaged, then when the upper body 3 is overlapped with (laid over) the lower body 2, the protrusion 84 engages with this recess to keep the upper body 3 from shifting relative to the lower body 2.

Second Embodiment

Next, with reference to FIGS. 24 to 26, a second embodiment of the present invention will be explained mainly about the point in which the second embodiment differs from the first embodiment.

Figure 24:
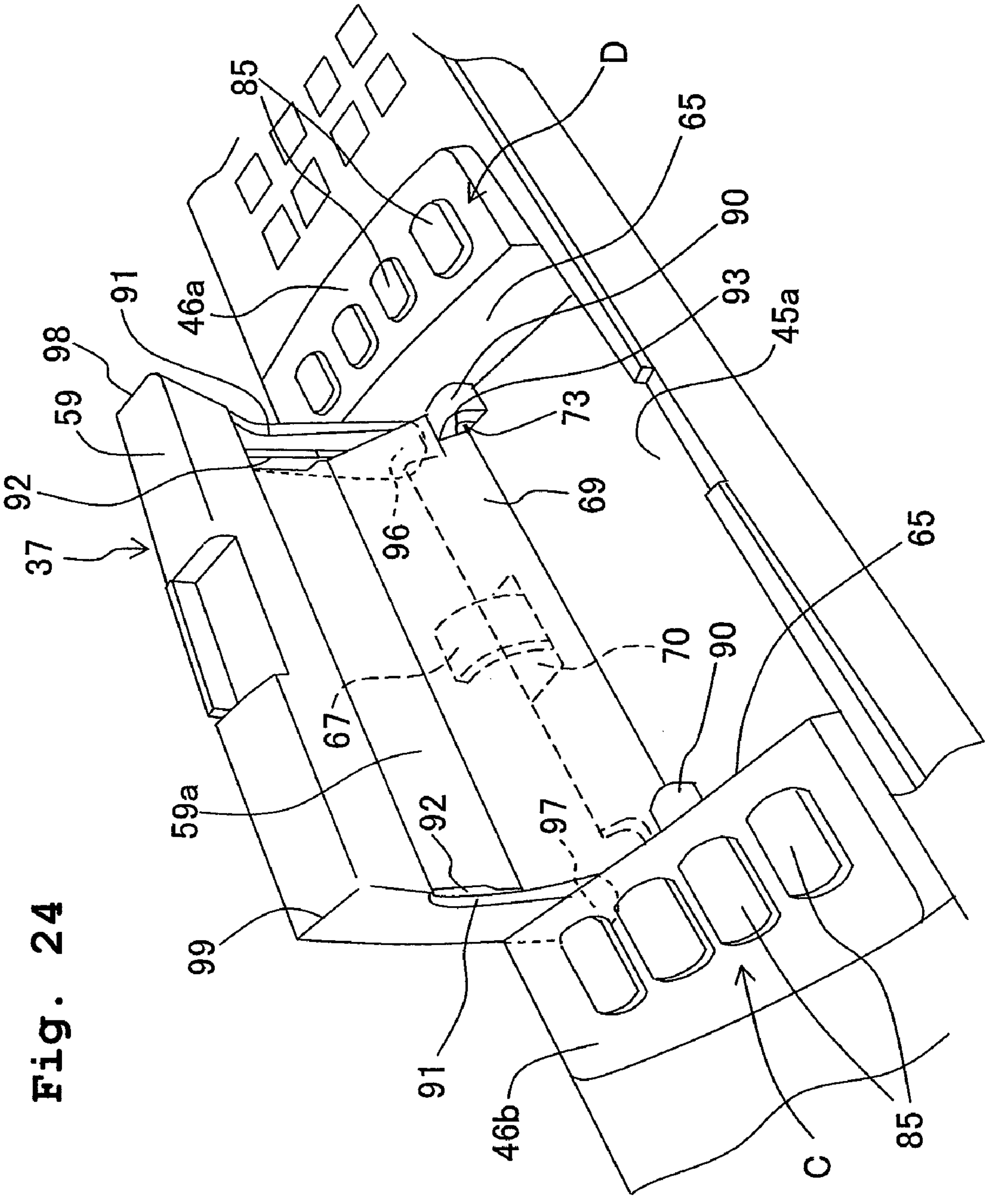
FIG. 24 is a perspective view of the LCD panel unit in a second embodiment, as viewed from the back surface side of the LCD panel unit with the LCD panel unit being erected in a roughly vertical state.

As shown in FIG. 24, a bottom plate 45*a* of the accommodation recess 45 of the display cover 41 has a pair of bosses 90 formed at a position behind the first guide opening 70 of the bottom plate 45*a*. Each of the bosses 90 has a cylindrical bearing hole. A pair of pivot pins 73, formed in the base end of the covering member 69 to protrude outwardly in mutually different directions, are supported rotatably by the bearing holes, respectively, of the bosses 90.

Figure 25A:
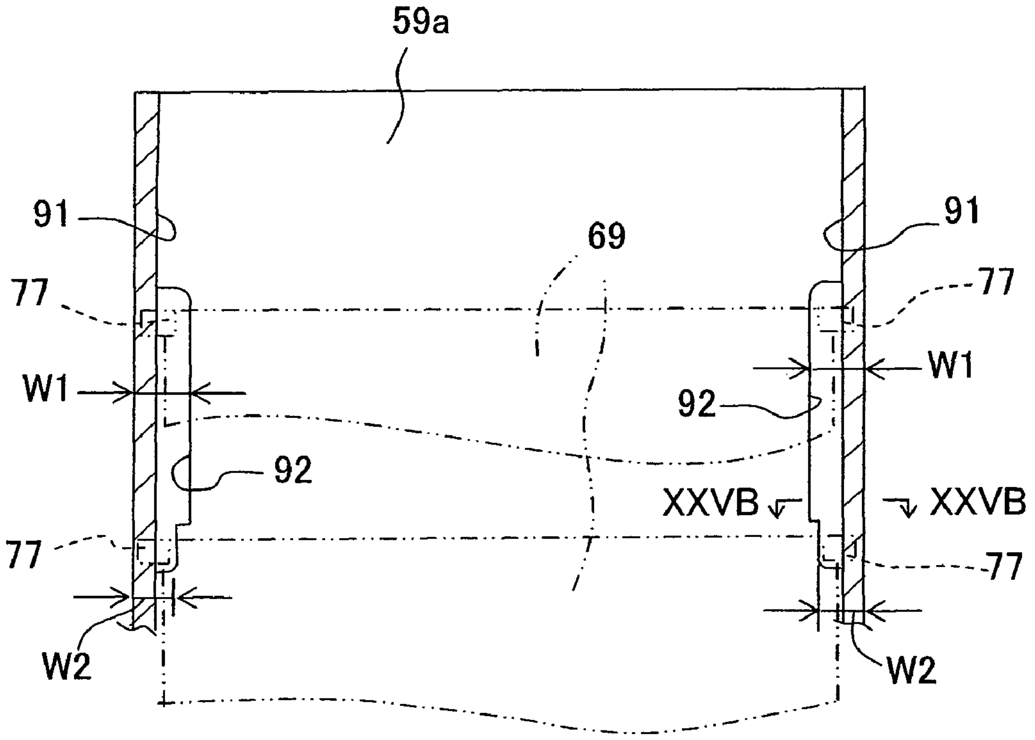
FIG. 25A is a plan view showing a relationship between a covering member and guide grooves in the second embodiment.
Figure 25B:
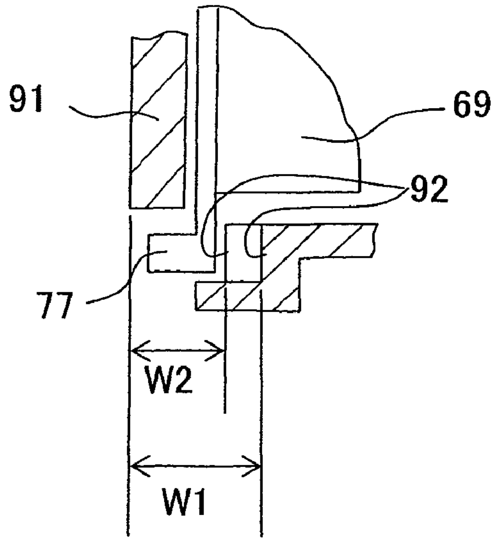
FIG. 25B is an enlarged sectional view taken along line XXVB-XXVB in FIG. 25A.

As shown in FIG. 24, the case 59 of the LCD panel unit 37 has a recess 59*a*, a pair of side walls 91, and a pair of guide grooves 92 formed in the back surface of the case 59. Each of the guide grooves 92 is formed in a corner at which a plane forming the recess 59*a* and one of the side walls 91 are intersected, and the guide grooves 92 extend from a side of the base end 96, 97 toward a side of the free ends 98, 99 respectively, of the LCD panel unit 37. Hereinafter, ends of the guide grooves 92 on the side of the base ends 96, 97 are referred to as "first ends", and the other ends of the guide grooves 92 on the side of the free ends 98, 99 are referred to as "second ends". As shown in FIGS. 25A and 25B, a width W1 of the second ends of the guide grooves 92 is greater than a width W2 of the first ends of the guide grooves. A pair of guide pins 77, protruding in mutually outwardly, is formed in the covering member 69 on the side of the free ends, respectively, and the pair of guide pins 77 are slidable in the forward and backward direction along the pair of the guide grooves 92.

Accordingly, when the LCD panel unit 37 assumes the posture in which the LCD panel unit 37 is erected substantially in the upright state (see FIG. 2), as shown in FIG. 24, the covering member 69 is inclined downward at about 45 degrees, with its free end positioned at the first ends of the guide grooves 92. With this, the FF cable 67 and the first guide opening 70 are positioned between and covered with the back surface of the case 59 of the LCD panel unit 37 and the covering member 69. When the LCD panel unit 37 assumes the posture at which the LCD panel unit 37 is laid down with the display screen 37*a* is oriented upward, namely when the LCD panel unit 37 is accommodated in the accommodation recess 45 (see FIG. 1), the side of the free end (the side of the guide pins 77) of the covering member 69 is positioned at the second ends of the guide grooves 92, with the covering member 69 being accommodated between the apparatus body of the image recording apparatus 1 and the LCD panel unit 37 such that the back surface of the case 59 is substantially in parallel with the covering member 69. This makes the LCD panel unit 37 low in height when the LCD panel unit 37 is in the laid-down state. In addition, the covering member 69 does not move into the lower body 2, as is the case with conventional covers which protect FF cables. This makes it unnecessary to preset a vertical space for the covering member 69, so that the image recording apparatus 1 can be compact. In this embodiment also, when the LCD panel unit 37 is in the laid-down state, the covering member 69 is positioned completely within the recess 59*a* (see FIG. 24) of the case 59, so that the LCD panel unit 37 is much lower in height. Further, the FF cable 67 and the first guide opening 70 are positioned between and covered with the back surface of the case 59 and the covering member 69. Thus, the covering member 69, which is attached to the case 59 of the LCD panel unit 37 such that the covering member 69 can be accommodated with respect to the case 59, covers and protects the FF cable 67 and the first guide opening 70, regardless of the angular postures which the LCD panel unit 37 assumes. This prevents users from touching the FF cable 67 carelessly and keeps trash, dust and other foreign bodies from entering the image recording apparatus 1 through the first guide opening 70.

The pivot pins 73 and guide pins 77 of the covering member 69 are roughly semi-cylindrical having a cross-section in which the round axis is partially cut out. Since the covering member 69 is flexible as stated above, the central portion of the covering member in the left and right direction can be curved so that the distance between the pivot pins 73 and the distance between the guide pins 77 can be shortened. This makes it easy to insert and attach the pins 73 and 77 into the pair of cylindrical bearing holes 93 and the pair of guide grooves 92 respectively. As shown in FIGS. 25A and 25B, the width W2 of the first ends of the guide grooves 92 is narrow as stated above. Accordingly, when the LCD panel unit 37 is in the upright posture, it is impossible to shorten the distance between the guide pins 77 even if the covering member 69 is curved. This keeps the free end portion of the covering member 69 from disengaging accidentally from the guide grooves 92.

Figure 26:
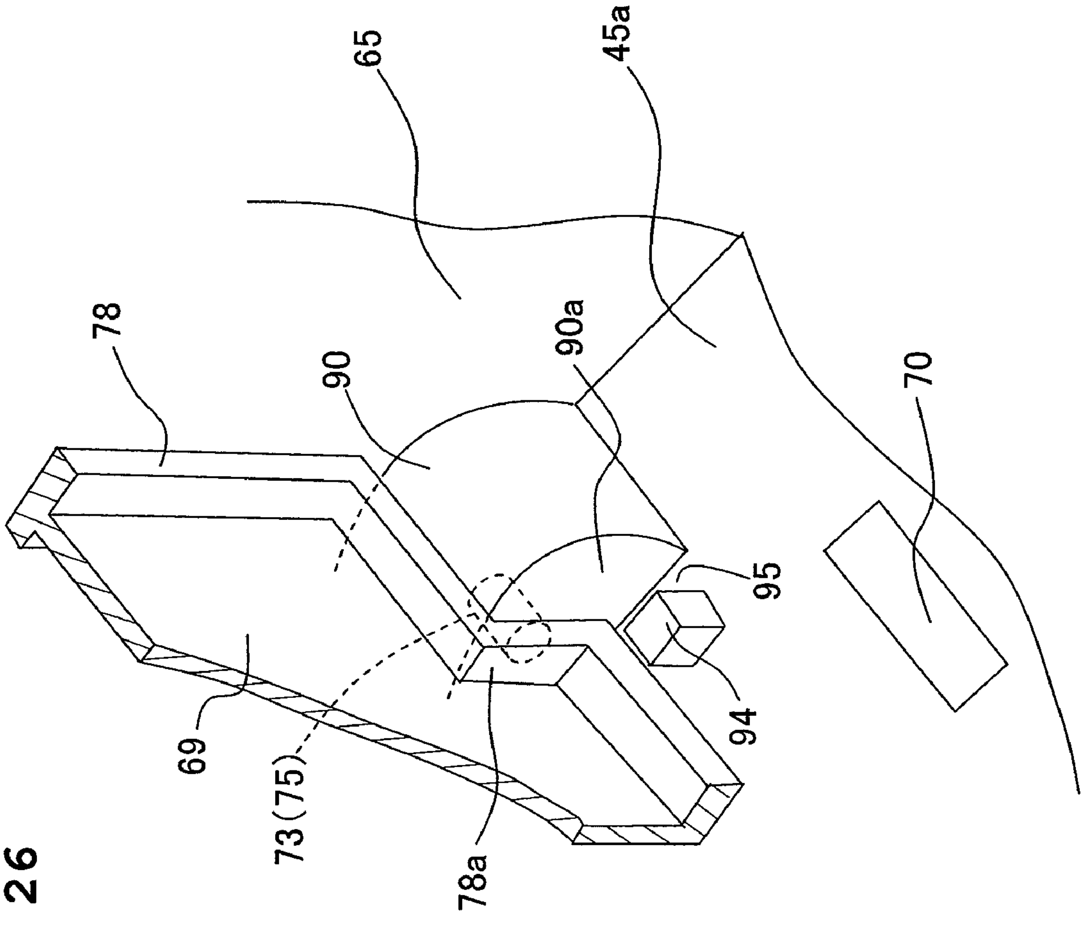
FIG. 26 is a partially cut-out perspective view showing the back surface side of a first end (base end) of the covering member in the second embodiment.

As shown in FIG. 26, the bottom plate 45*a* of the accommodation recess 45 has a protrusion 94. A gap 95 is formed between the protrusion 94 and an inner side surface 90*a* of the boss 90 formed on the bottom plate 45*a*. As shown in FIG. 26, the covering member 69 has a rib 78 formed integrally on its back surface. The rib 78 include a vertical rib 78*a* protrudingly formed on a side of the base end. When the LCD panel unit 37 is erected substantially in the upright state, the rib 78*a* is fitted to or engages with the gap 95. Even if the covering member 69 is curved, the engagement of the rib 78*a* with the gap 95 keeps the distance between the pivot pins 73 from shortening. This keeps the covering member 69 from disengaging accidentally from the display cover 41.

In each of the embodiments, the latch mechanism (mechanism for adjusting the angular posture of the LCD panel unit 37 and for holding the LCD panel unit 37 in different angular postures) is constructed of the latch 51 provided to the movable hinge 49 and the click 64 arranged on the side of the case 59. However, the latch mechanism may be replaced by saw-tooth latches formed in the guide grooves along which the free end of the covering member 69 can be guided slidably.

When the LCD panel unit 37 is configured such that the LCD panel unit 37 may pivot between the horizontal and upright postures and may be held at any angle between these postures, it is easy for a user to adjust the view angle at which the LCD panel unit 37 is clearly visible, without shifting user's face or otherwise varying user's posture so that user's line of sight can be substantially orthogonal to the display screen of the LCD panel unit 37. This also makes it easy to adjust the contrast on the LCD panel unit 37 so as to keep the contrast sharp.

In each of the embodiments, although the FF cable 67 is used to transmit signals from the main control board 33 to the LCD panel unit 37 so that images can be displayed on the screen, any cable or wiring, such as a harness with ordinary copper wires covered with film, may be used instead of the FF cable 67.

In each of the embodiments, the FF cable 67 and the guide opening 70 are covered with the back surface of the LCD panel unit 37 and the covering member 69. Alternatively, the FF cable 67 and the guide opening 70 may not exist (may be omitted). Instead, a member such as a circuit board may be arranged. In this case, since the back surface of the LCD panel unit 37 is covered with the covering member 69, the image recording apparatus 1 is excellent in terms of design. In addition, since the circuit board and the like are covered with the covering member 69, users are kept from touching them inadvertently.

In each of the embodiments, although the covering member 69 has a pair of base ends and a pair of free ends, the covering member may have one base end and one free end, both of which may be arranged at the center position in the width direction of the covering member 69.

Needless to say, the present invention can be applied not only to the multi-function image recording apparatus 1 but also to uni-function image recording apparatuses such as printers, copying machines, and fax machines, with results similar to the foregoing results.

What is claimed is:

1. An image recording apparatus comprising:

an apparatus body;

a recording section which forms an image;

a display panel which selectively pivots about a predetermined axis between a retracted position and a protruding position with respect to the apparatus body, the display panel being formed with an opening on a back surface of the display panel;

a cable extending from the opening of the back surface of the display panel; and a covering member having a first end mounted pivotably on one of the apparatus body and the display panel and a second end being slidable on the other of the apparatus body and the display panel, wherein:

when the display panel is in the retracted position, the display panel covers the cable; and when the display panel is in the protruding position, the covering member covers the cable and the opening of the back surface of the display panel.

2. The image recording apparatus according to claim 1, further comprising a guide opening formed in the apparatus body, wherein the cable is a flexible flat cable connected to an electrical component through the guide opening.

3. The image recording apparatus according to claim 1, wherein one of the display panel and the apparatus body is provided with a guide groove with which the second end of the covering member engages slidably.

4. The image recording apparatus according to claim 1, wherein the covering member is formed to have a shape of flat plate and is flexible.

5. The image recording apparatus according to claim 1, wherein the first end of the covering member is pivotable mounted on the display panel; and the second end of the covering member is slidably engaged with the apparatus body.

6. The image recording apparatus according to claim 1, wherein the first end of the covering member is pivotably mounted on the apparatus body; and the second end of the covering member is slidably engaged with the display panel.

7. The image recording apparatus according to claim 1, wherein the back surface of the display panel is flat.

8. The image recording apparatus according to claim 1, further comprising a restricting member which restricts the covering member from pivoting when the display panel is in the protruding position.

9. The image recording apparatus according to claim 5, wherein the opening of the display panel is formed at a position between a first axis around which the display panel pivots and a second axis around which the covering member pivots.

* * * * *